(12) United States Patent
Shimada et al.

(10) Patent No.: US 10,845,942 B2
(45) Date of Patent: Nov. 24, 2020

(54) INFORMATION PROCESSING DEVICE AND INFORMATION PROCESSING METHOD

(71) Applicant: SONY CORPORATION, Tokyo (JP)

(72) Inventors: Hirofumi Shimada, Kanagawa (JP); Kouji Ogawa, Tokyo (JP); Yuta Murata, Kanagawa (JP); Masako Komuro, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/324,998

(22) PCT Filed: Aug. 17, 2017

(86) PCT No.: PCT/JP2017/029489
§ 371 (c)(1),
(2) Date: Feb. 12, 2019

(87) PCT Pub. No.: WO2018/043135
PCT Pub. Date: Mar. 8, 2018

(65) Prior Publication Data
US 2019/0179511 A1 Jun. 13, 2019

(30) Foreign Application Priority Data
Aug. 31, 2016 (JP) ................. 2016-169336

(51) Int. Cl.
*G06F 3/048* (2013.01)
*G06F 3/0481* (2013.01)
(Continued)

(52) U.S. Cl.
CPC .......... *G06F 3/04815* (2013.01); *G06F 3/011* (2013.01); *G06F 3/04817* (2013.01);
(Continued)

(58) Field of Classification Search
CPC .. G06F 3/04815; G06F 3/011; G06F 3/04817; G06F 3/04845; G06F 3/048;
(Continued)

(56) References Cited

U.S. PATENT DOCUMENTS

2002/0163547 A1* 11/2002 Abramson ........... G01C 21/367
715/855
2007/0288164 A1* 12/2007 Gordon ................. G01C 21/20
701/469
(Continued)

FOREIGN PATENT DOCUMENTS

| CA | 2941469 A1 | 9/2015 |
|----|-----------|--------|
| CN | 103918003 A | 7/2014 |

(Continued)

OTHER PUBLICATIONS

Risa, et al., "A Collaborative Map System Capable of Operation Sharing by Multiple Users", 2016 Information Processing Society of Japan, May 13, 2016 11 pages.

(Continued)

*Primary Examiner* — Jeanette J Parker
(74) *Attorney, Agent, or Firm* — Chip Law Group

(57) ABSTRACT

Provided is an information processing device enabling performance of display that causes a user to recognize a position in a picture. Display of a screen is controlled, the screen includes a visual-field picture displaying a region of part of a three-dimensional picture, an indicator having a shape expressing a three-dimensional direction of the three-dimensional picture and a window expressing the region displayed as the visual-field picture in the indicator. The three-dimensional picture is an entire-celestial-sphere picture. Furthermore, the indicator is a three-dimensional sphere with wire frame.

18 Claims, 17 Drawing Sheets

(51) Int. Cl.
   *G06F 3/01*       (2006.01)
   *G06F 3/0484*     (2013.01)
   *H04N 21/4728*       (2011.01)
   *H04N 21/81*         (2011.01)
   *H04N 21/431*        (2011.01)

(52) U.S. Cl.
   CPC ..... *G06F 3/04845* (2013.01); *H04N 21/4316* (2013.01); *H04N 21/4728* (2013.01); *H04N 21/816* (2013.01)

(58) Field of Classification Search
   CPC ............. H04N 21/4728; H04N 21/816; H04N 21/4316
   See application file for complete search history.

(56) References Cited

U.S. PATENT DOCUMENTS

| | | | | |
|---|---|---|---|---|
| 2009/0160996 | A1* | 6/2009 | Yamaoka | G06T 5/006 348/333.11 |
| 2011/0244888 | A1* | 10/2011 | Ohki | G01C 21/362 455/456.2 |
| 2013/0109470 | A1* | 5/2013 | Yamashita | A63F 13/577 463/31 |
| 2014/0313284 | A1 | 10/2014 | Ohki et al. | |
| 2016/0048942 | A1* | 2/2016 | Irie | H04N 5/2258 345/619 |
| 2017/0256072 | A1* | 9/2017 | Shimmoto | H04N 5/23238 |
| 2018/0124310 | A1* | 5/2018 | Taneichi | H04N 5/23238 |
| 2018/0181568 | A1* | 6/2018 | Leong | G06F 16/5866 |
| 2018/0333095 | A1* | 11/2018 | Sartor | A61B 34/20 |

FOREIGN PATENT DOCUMENTS

| | | |
|---|---|---|
| CN | 106133794 A | 11/2016 |
| EP | 2336970 A2 | 6/2011 |
| EP | 3120327 A1 | 1/2017 |
| JP | 09-152353 A | 6/1997 |
| JP | 2000-193464 A | 7/2000 |
| JP | 2000-339499 A | 12/2000 |
| JP | 2001-249747 A | 9/2001 |
| JP | 2002-132410 A | 5/2002 |
| JP | 2005-502936 A | 1/2005 |
| JP | 2007-140826 A | 6/2007 |
| JP | 2008-002928 A | 1/2008 |
| JP | 2013-045089 A | 3/2013 |
| JP | 2013-101525 A | 5/2013 |
| JP | 2015-176559 A | 10/2015 |
| JP | 2015-230625 A | 12/2015 |
| JP | 2015230625 * | 12/2015 |
| WO | 2002/089058 A1 | 11/2002 |
| WO | 2013/069555 A1 | 5/2013 |
| WO | 2015/141605 A1 | 9/2015 |
| WO | 2015/170483 A1 | 11/2015 |

OTHER PUBLICATIONS

Risa, et al., "A Collaborative Map System Capable of Operation Sharing by Multiple Users", 2016 Information Society of Japan, IPSJ SIG Technical Report, May 2016, pp. 1-8.

International Search Report and Written Opinion of PCT Application No. PCT/JP2017/029489, dated Nov. 7, 2017, 13 pages of ISRWO.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/029489 filed on Aug. 17, 2017, which claims priority benefit of Japanese Patent Application No. JP 2016-169336 filed in the Japan Patent Office on Aug. 31, 2016. Each of the above-referenced applications is hereby incorporated herein by reference in its entirety.

TECHNICAL FIELD

The present technology relates to an information processing device, an information processing method, and a program, and relates to an information processing device that displays a three-dimensional picture, such as an entire-celestial-sphere picture or the like, an information processing method, and a program.

BACKGROUND ART

For example, acquisition of an entire-celestial-sphere picture by a combination of images captured with a plurality of wide-angle lenses, has been proposed (for example, refer to Patent Document 1).

Furthermore, performance of display that enables a user to easily grasp a spatial image for an entire-celestial-sphere picture, has been proposed (for example, refer to Patent Document 2).

CITATION LIST

Patent Document

Patent Document 1: Japanese Patent Application Laid-Open No. 2013-45089
Patent Document 2: Japanese Patent Application Laid-Open No. 2015-230625

SUMMARY OF THE INVENTION

Problems to be Solved by the Invention

According to Patent Document 2, the user can verify a gaze position or a visual-point path to the entirety of the entire-celestial-sphere picture, but cannot verify, for example, from which region to the entire-celestial-sphere picture an image in the current visual field has been cut out. Display that enables the user to further enjoy an entire-celestial-sphere picture, is desirable to perform.

The present technology has been made in consideration of the situation, and an object of the present technology is to enable performance of display that makes an entire-celestial-sphere picture further enjoyable.

Solutions to Problems

An information processing device according to one aspect of the present technology, includes: a control unit configured to control display of a screen, in which the screen includes: a visual-field picture displaying a region of part of a three-dimensional picture; an indicator having a shape expressing a three-dimensional direction of the three-dimensional picture; and a window expressing the region displayed as the visual-field picture in the indicator.

An information processing method according to one aspect of the present technology, includes: a step of controlling display of a screen, in which the screen includes: a visual-field picture displaying a region of part of a three-dimensional picture; an indicator having a shape expressing a three-dimensional direction of the three-dimensional picture; and a window expressing the region displayed as the visual-field picture in the indicator.

A program according to one aspect of the present technology, causes a computer to perform processing including: a step of controlling display of a screen, in which the screen includes: a visual-field picture displaying a region of part of a three-dimensional picture; an indicator having a shape expressing a three-dimensional direction of the three-dimensional picture; and a window expressing the region displayed as the visual-field picture in the indicator.

In an information processing device, an information processing method, and a program according to one aspect of the present technology, display of a screen is controlled, the screen including: a visual-field picture displaying a region of part of a three-dimensional picture; an indicator having a shape expressing a three-dimensional direction of the three-dimensional picture; and a window expressing the region displayed as the visual-field picture in the indicator.

Note that an information processing device may be an independent device or may be an internal block included in one device.

Furthermore, transferring through a transfer medium or recording on a recording medium enables provision of a program.

Effects of the Invention

According to one aspect of the present technology, display that makes an entire-celestial-sphere picture further enjoyable, can be performed.

Note that, the effect described here is not necessarily limitative, and any of the effects described in the present disclosure may be provided.

MODE FOR CARRYING OUT THE INVENTION

A mode for carrying out the present technology (hereinafter, referred to as an embodiment) will be described below.

<Configuration of Information Processing Device>

Figure 1:
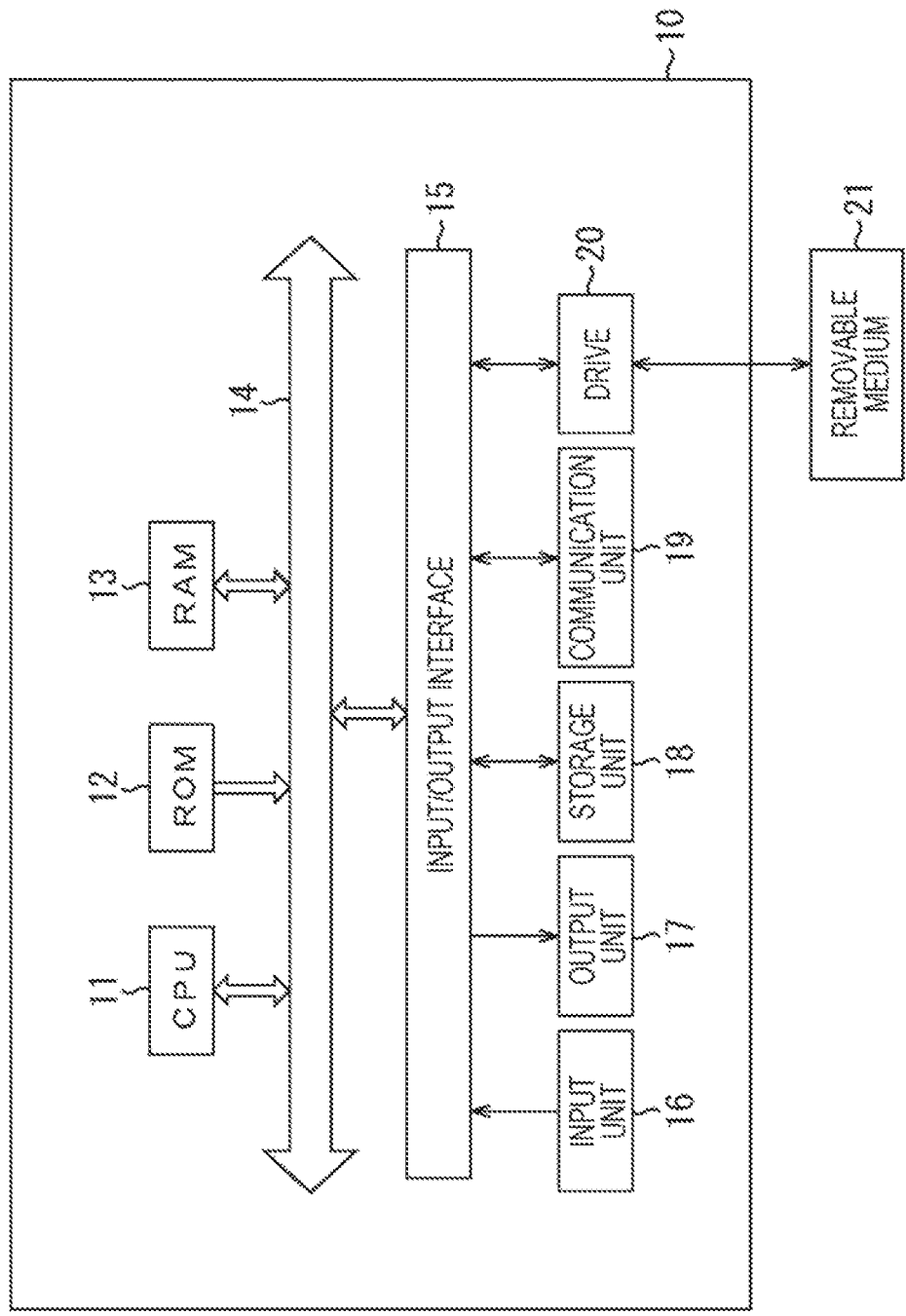
FIG. 1 is a diagram of the configuration of one embodiment of an information processing device applied with the present technology.

FIG. 1 is a diagram of the configuration of one embodiment of an information processing device applied with the present technology. A central processing unit (CPU) 11, a read only memory (ROM) 12, and a random access memory (RAM) 13 in the information processing device 10 illustrated in FIG. 1 are mutually connected through a bus 14. Moreover, an input/output interface 15 is connected to the bus 14. An input unit 16, an output unit 17, a storage unit 18, a communication unit 19, and a drive 20 are connected to the input/output interface 15.

The input unit 16 includes, for example, a keyboard, a mouse, and a microphone. The output unit 17 includes, for example, a display and a speaker. The storage unit 18 includes, for example, a hard disk and a non-volatile memory. The communication unit 19 includes, for example, a network interface. The drive 20 drives a removable medium 21, such as a magnetic disk, an optical disc, a magneto-optical disc, or a semiconductor memory.

The information processing device 10 that is an information terminal, such as a personal computer, a tablet, a smartphone, a game console, or the like has a function of displaying a predetermined picture (image). Furthermore, the information processing device 10 may be an information terminal to be used while being worn on a user, the information terminal being termed, for example, a head-mounted display.

Although no illustration is given, the information processing device 10 may be, for example, a server or may be a device that supplies data to or control a different device through a network. For example, a different device is a display device having a display function (e.g., the display or the like included in the output unit 17). The information processing device 10 and the display device are connected through a network, and the information processing device 10 supplies data to the display device and controls display of a picture based on the data through the network.

Furthermore, the information processing device 10 may include a single device or may include a plurality of devices. In a case where including the plurality of devices, the information processing device 10 can perform transmission and reception of data through a network.

Furthermore, in a case where the information processing device 10 is the head-mounted display, for example, a display unit and a sensor are provided. However, the display unit and the sensor can be provided separately from the information processing device 10.

<Function of Information Processing Device>

Figure 2:
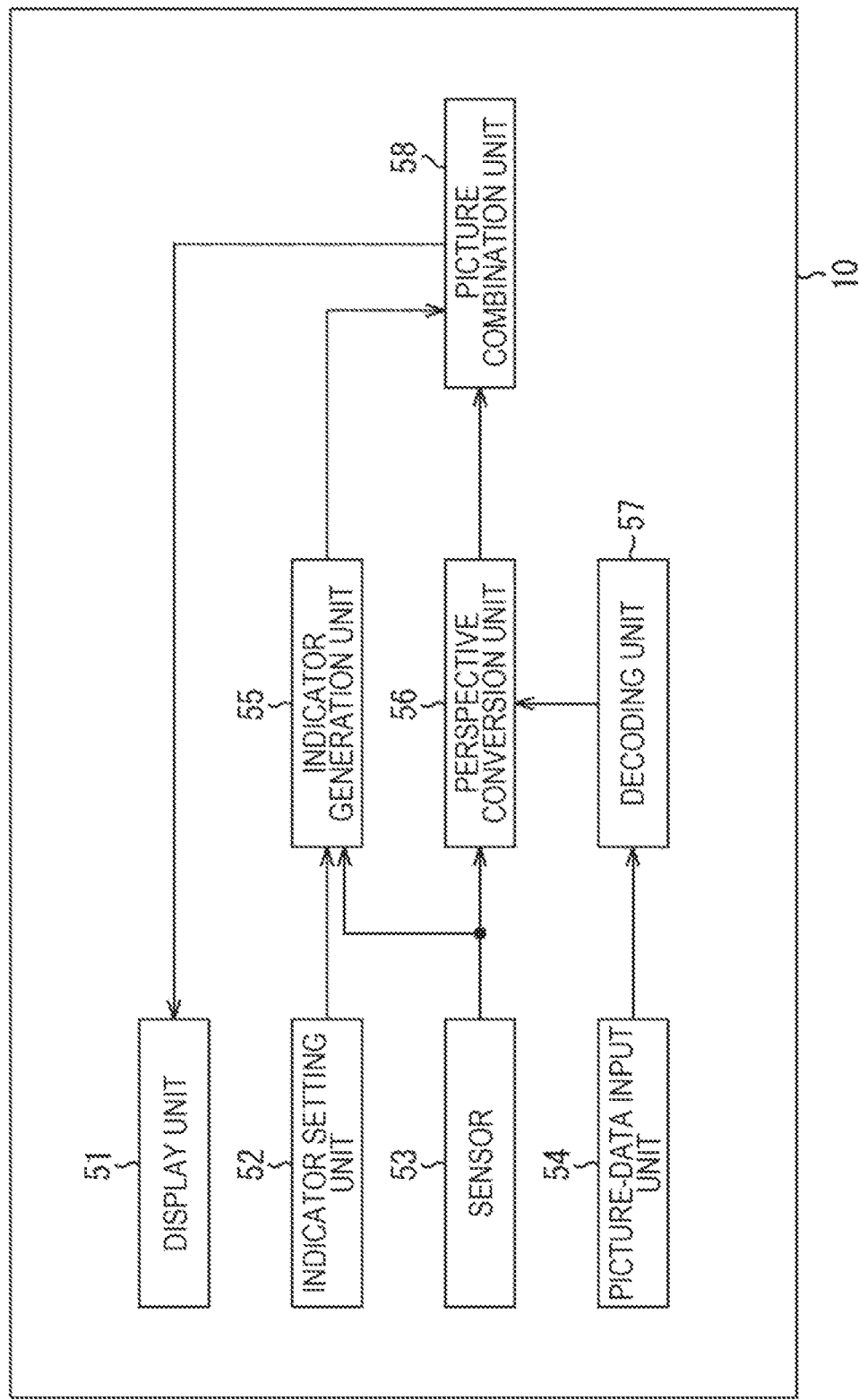
FIG. 2 is a diagram for describing the function of the information processing device.

FIG. 2 is a diagram for describing functions included in the information processing device 10. Each function illustrated in FIG. 2 may be a function to be achieved by the information processing device 10 on a hardware basis, or may be a function to be achieved by execution of a program by the information processing device 10 (CPU 11).

The information processing device 10 includes a display unit 51, an indicator setting unit 52, a sensor 53, a picture-data input unit 54, an indicator generation unit 55, a perspective conversion unit 56, a decoding unit 57, and a picture combination unit 58.

The display unit 51 displays a picture to be provided to a user. As described later, a screen to be displayed on the display unit 51 includes a main image and a sub-image. The sub-image is termed an indicator. The indicator is an image indicating which part of the entirety the main image has displayed, to the user.

The indicator setting unit 52 sets the indicator to be displayed. A plurality of methods of displaying the indicator is provided so as to be selected and set in accordance with an instruction of the user or a predetermined condition. Furthermore, a setting of not displaying the indicator can be made in accordance with an instruction of the user.

The sensor 53 includes a sensor that detects the attitude of the user or the position of the user, such as an acceleration sensor, a gyroscope sensor, a GPS sensor, or the like, and a sensor that detects an environmental status around the user, such as temperature or pressure.

The indicator setting unit 52 and the sensor 53 also function as an operation unit that receives an instruction from the user. For example, the operation unit receives an instruction for an image from the user, such as enlargement or reduction of the image. Furthermore, the operation unit allows the user to specifically issue an instruction with a graphical user interface (GUI) or the like.

Set information from the indicator setting unit 52 and sensor information from the sensor 53 are supplied to the indicator generation unit 55. The indicator generation unit 55 determines the set indicator from the set information, and generates, on the indicator based on a result of the determination, an indicator image in which a window is displayed, the window indicating a region corresponding to the region the user is viewing, acquired from the sensor information.

The picture-data input unit 54 inputs (acquires) picture data compressed in a scheme, such as advanced video coding (AVC) or high efficiency video coding (HEVC). The input picture data includes an entire-celestial-sphere picture. Furthermore, the picture-data input unit 54 reads picture data from a recording medium to acquire the picture data, or acquires picture data supplied from a different device through a network.

Here, the description will be continued with an exemplary case where the entire-celestial-sphere picture is handled, but a three-dimensional picture or the like may be provided. The entire-celestial-sphere picture is a picture in which a 360-degree picture around a visual point is captured simultaneously, or, on the assumption of the picture, a picture created with, for example, computer graphics (CG). More generally, in case where projection is performed inside a spherical surface or on the spherical surface, the entire-celestial-sphere picture has no discontinuity at any point.

Furthermore, the three dimensional picture (3D picture) is a picture in which original data including a three-dimensional model is projected perspectively in two dimensions, or a stereoscopic picture with disparity.

The picture data input in the picture-data input unit 54 is supplied to the decoding unit 57. The decoding unit 57 decodes the compressed picture data to generate the decompressed picture data. The picture data generated by the decoding unit 57 includes the decompressed entire-celestialsphere picture. The picture data generated by the decoding unit 57 is supplied to the perspective conversion unit 56.

The picture data that is input into the picture-data input unit 54 and is decoded by the decoding unit 57, may include, for example, baseband picture signals captured by a plurality of camera units, or an entire-celestial-sphere baseband picture signal in which the baseband picture signals are coupled by stitch processing.

The sensor information from the sensor 53 and the picture data from the decoding unit 57 are supplied to the perspective conversion unit 56. The perspective conversion unit 56 determines a parameter necessary for perspective conversion, from attitude sensor information and zoom set information. Moreover, the perspective conversion unit 56 maps the entire-celestial-sphere picture onto a 3D model (sphere) and generates a virtual sphere, to generate an entire-celestial-sphere partial picture with application of the perspective conversion, or generates an entire-celestial-sphere partial picture with direct application of the perspective conversion without generating the virtual sphere.

The indicator image generated by the indicator generation unit 55 and the entire-celestial-sphere partial picture generated by the perspective conversion unit 56 are supplied to the picture combination unit 58. The picture combination unit 58 combines the entire-celestial-sphere partial picture and the indicator image, generates the entire-celestial-sphere partial picture including the indicator image displayed on part of the entire-celestial-sphere partial picture, and outputs the entire-celestial-sphere partial picture to the display unit 51.

Figure 3:
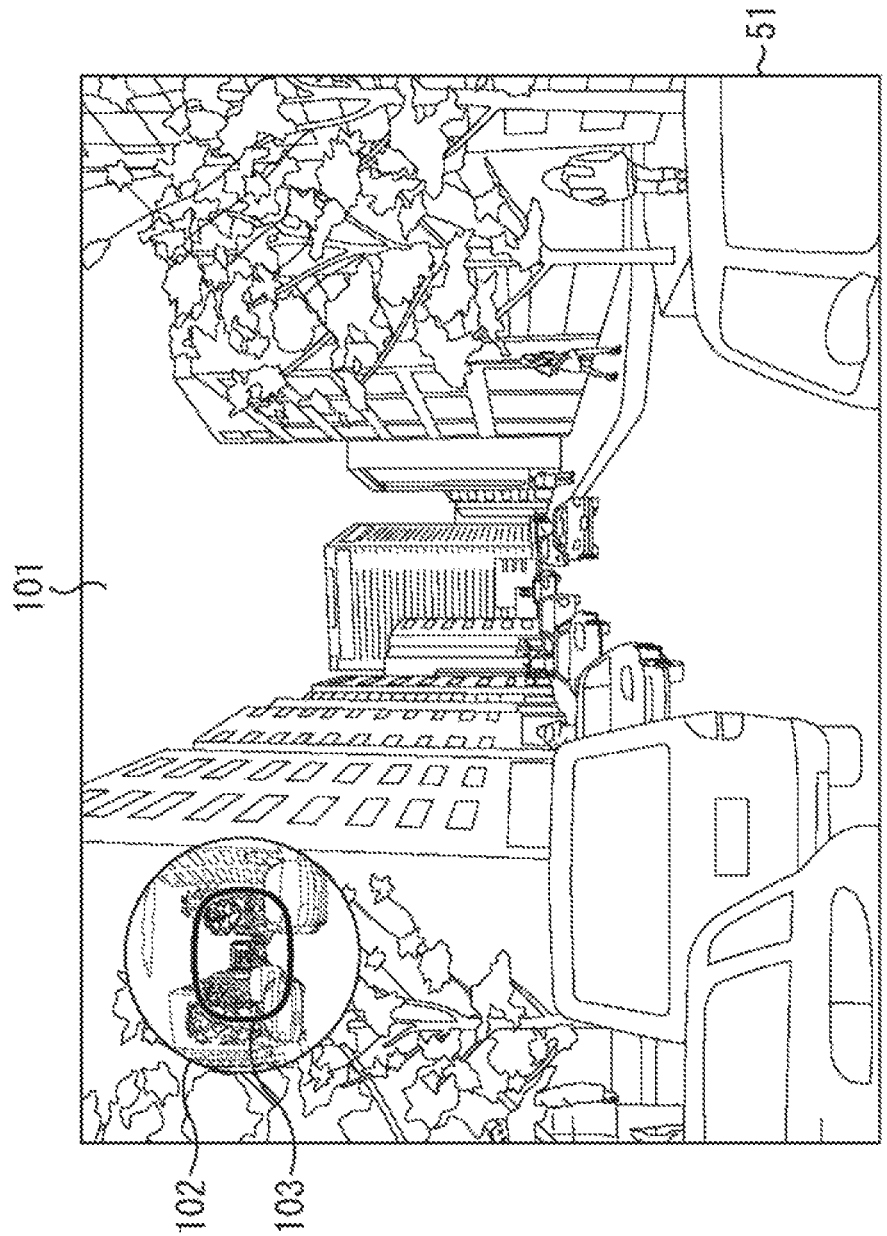
FIG. 3 is a view of an exemplary screen displayed on a display unit.

The display unit 51 displays the entire-celestial-sphere partial picture generated by the picture combination unit 58. The user can view the entire-celestial-sphere partial picture simultaneously with the indicator indicating the position of the partial picture to the entirety. FIG. 3 illustrates an exemplary screen displayed on the display unit 51.

<Exemplary Screen>

The exemplary screen illustrated in FIG. 3 has a visual-field picture 101 (entire-celestial-sphere partial picture) displayed on the display unit 51 and an indicator 102 displayed on the upper left of the visual-field picture 101. A window 103 is displayed in the indicator 102. The picture displayed in the window 103 is displayed as the visual-field picture 101.

The indicator 102 expresses the entire-celestial-sphere picture, and part in the entire-celestial-sphere picture is displayed as the visual-field picture 101. The indicator 102 is displayed in order to cause the user to recognize which part of the entire-celestial-sphere picture the part displayed as the visual-field picture 101 is.

In other words, the indicator 102 is a figure having a shape capable of covering all directions of an entire celestial sphere (capable of expressing all directions). The screen on which the figure is superimposed on the visual-field picture 101, is presented to the user. Furthermore, the window 103 displayed in the indicator 102 indicates which region in the indicator 102 the part of the entire-celestial-sphere picture provided to the user as the visual-field picture 101, is, in other words, which region of the entire-celestial-sphere picture the part is.

For example, in a case where the user faces upward, the sensor 53 detects that the user has faced upward. On the basis of the detection, the perspective conversion unit 56 switches the visual-field picture 101 to an upper picture in the entire-celestial-sphere picture. Furthermore, the indicator generation unit 55 switches the image in the indicator 102 to an upper picture in the entire-celestial-sphere picture.

Figure 4:
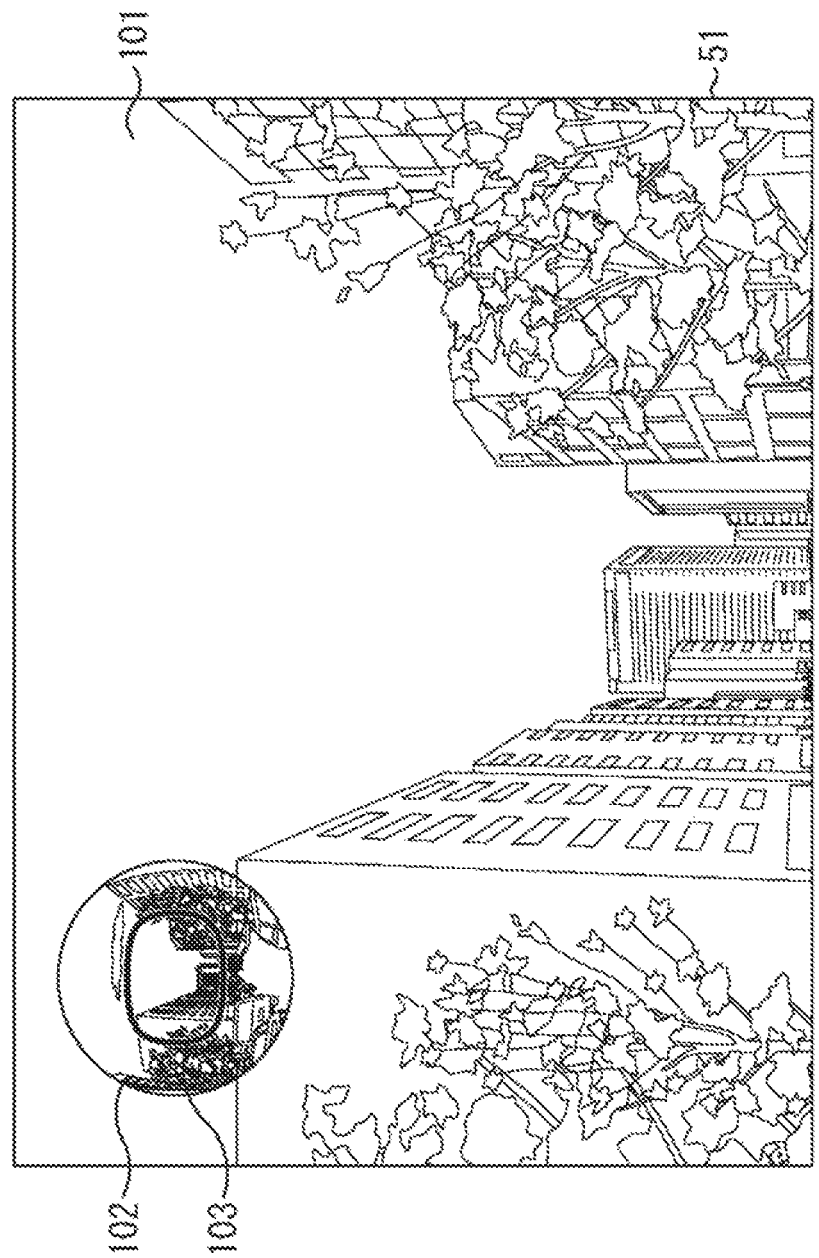
FIG. 4 is a view of an exemplary indicator.

The performance of the switching causes, for example, a screen illustrated in FIG. 4 to be displayed on the display unit 51.

Because the user has faced upward, the visual-field picture 101 illustrated in FIG. 4 includes a switched picture in which the rooftops of buildings and the sky are visible more than those in the visual-field picture 101 illustrated in FIG. 3. Along with the switching, the entire-celestial-sphere picture in the indicator 102 switches. The window 103 is displayed at the same position without moving in the indicator 102.

In this case, the window 103 is fixed in the indicator 102 and the image in the indicator 102 switches. In other words, display of giving the user a feeling that a sphere serving as the indicator 102 rotates with the window 103 fixed, is performed.

The window 103 may move with the image in the indicator 102, fixed. In other words, display of giving the user a feeling that the window 103 moves on the surface of the sphere with the sphere serving as the indicator 102, fixed, may be performed. For example, when it is detected that the user has faced upward, the window 103 may be displayed at the position moved upward in the indicator 102.

In a case where the indicator 102 is movable with the window 103 fixed or in a case where the window 103 is movable with the indicator 102 fixed, when an change is made to the visual-field picture 101 that is the main image, the image in the indicator 102 changes, following the change.

Moreover, the indicator 102 may be movable with the window 103 movable. As described later, information can be superimposed on the indicator 102 or the user can operate the indicator 102 itself. In a case where the arrangement is provided, for example, the indicator 102 operates to rotate in accordance with an instruction of the user in some cases.

In a case where the indicator 102 itself operates in that manner, the image in the indicator 102 changes in accordance with the instruction of the user, and the display position of the window 103 changes, following the change. In this case, the visual-field picture 101 that is the main image, does not change. Because the visual-field picture 101 does not change, the window 103 moves, following the change of the indicator 102.

In other words, because no change is made to the relative position of the window 103 in the indicator 102 and the position of the window 103 in the indicator 102 is fixed, even when the indicator 102 or the window 103 moves, the visual-field picture 101 does not change.

With the display of the indicator 102 in this manner, for example, in a case where the user operates the indicator 102 to find a location to be viewed desirably or information, performance of a predetermined operation to the indicator 102 enables the location to be viewed desirably or the information, to be displayed as the visual-field picture 101.

The example in which the indicator 102 is displayed in an upper left region in the screen, has been given in FIG. 2 or 3, but the display region is not limited to the upper left region. Thus, the indicator 102 may be displayed in a different region, such as a lower left region, an upper right region, a lower right region, or the like. Furthermore, the indicator 102 may be displayed in a region specified by the user.

Furthermore, in a case where a black-belt portion is present in any of upper, lower, right, and left regions on the visual-field picture 101 displayed on the display unit 51, the indicator 102 may be displayed on the black-belt portion.

Moreover, as described later, the display position of the indicator 102 is not necessarily fixed, and thus the display position of the indicator 102 may change in accordance with a predetermined condition.

Furthermore, the size of the indicator 102 may be fixed or may change to a predetermined size, for example, when some sort of condition is satisfied or when the user issues an instruction.

The visual-field picture 101 displayed together with the indicator 102 may be an already created picture or a picture generated at a point in time during viewing. For example, a picture created with computer graphics (CG) as virtual space or a picture having previously captured scenery edited, can be provided.

Furthermore, an image pickup unit (not illustrated) may be provided in the information processing device 10, and a picture captured by the image pickup unit may be displayed as the visual-field picture 101. Furthermore, the display unit 51 may include a transparent display, and scenery observed by the user who has worn the information processing device 10, may be made visible through the display. Then, the scenery visible through the display may be provided as the visual-field picture 101. In this case, the indicator 102 can express, for example, the position of the user at the point in time.

<Types of Indicator>

Exemplary displays of the indicator 102 will be described below.

Figure 5:
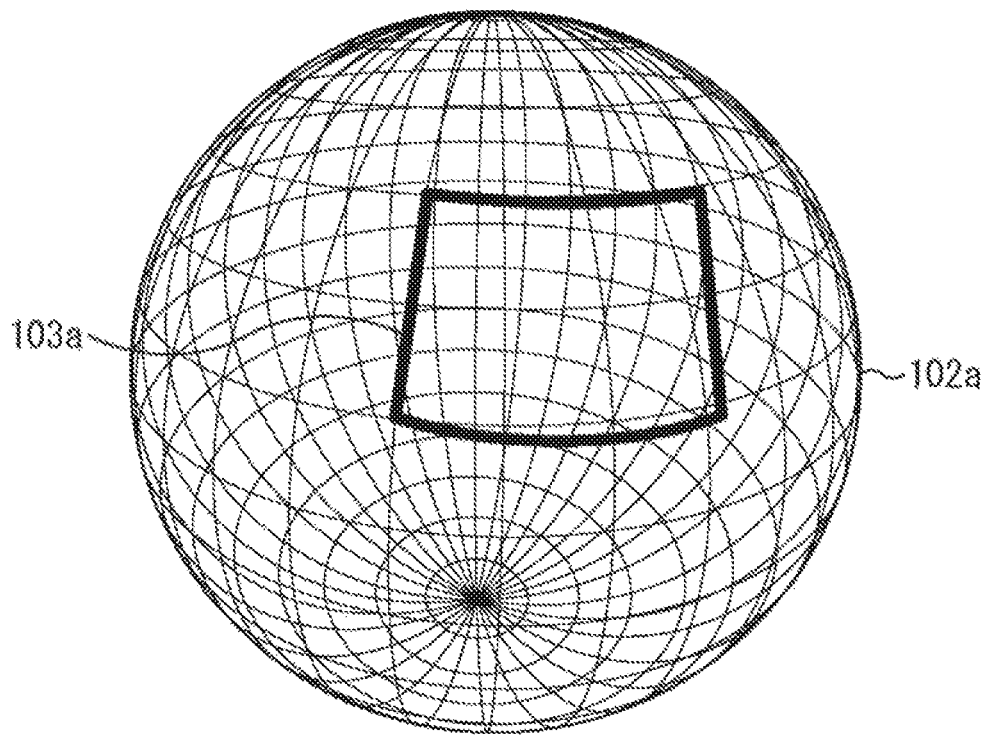
FIG. 5 is a view of another exemplary indicator.

An indicator 102a illustrated in FIG. 5 expresses an image including a wire-frame three-dimensional sphere perspectively converted in two dimensions. A substantially quadratic window 103 is displayed on the surface of the wire-frame three-dimensional sphere. The window 103 expresses the position (region) of the picture provided to the user as the visual-field picture 101 in the entire-celestial-sphere picture, as described above.

Note that the color of the window 103 may be, for example, red or blue, other than black. Furthermore, the window 103 may be displayed with the inside filled with a predetermined color. In a case where the window 103 is displayed with the filling, the color may be translucent. The color of the frame of the window 103 and the color of the inside are not limited to the window 103 illustrated in FIG. 5, and thus can be appropriately applied to the windows 103 illustrated in the other figures.

Figure 6:
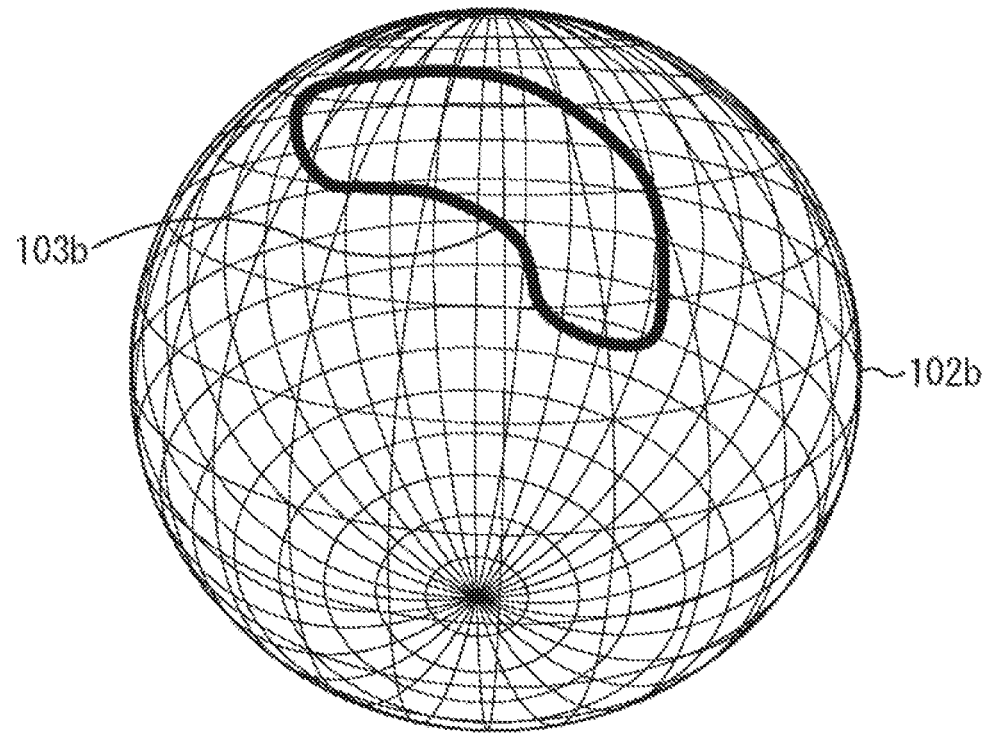
FIG. 6 is a view of another exemplary indicator.

An indicator 102b illustrated in FIG. 6 expresses an image including a wire-frame three-dimensional sphere perspectively converted in two dimensions, similarly to the indicator 102a illustrated in FIG. 5. A window 103b displayed on the indicator 102b illustrated in FIG. 6, has a curved shape. Thus, the window 103 may have a shape other than a quadratic shape. Furthermore, the window 103 may have a shape substantially the same as the shape of the display unit 51 (the shape of a display frame) (FIG. 2).

Figure 7:
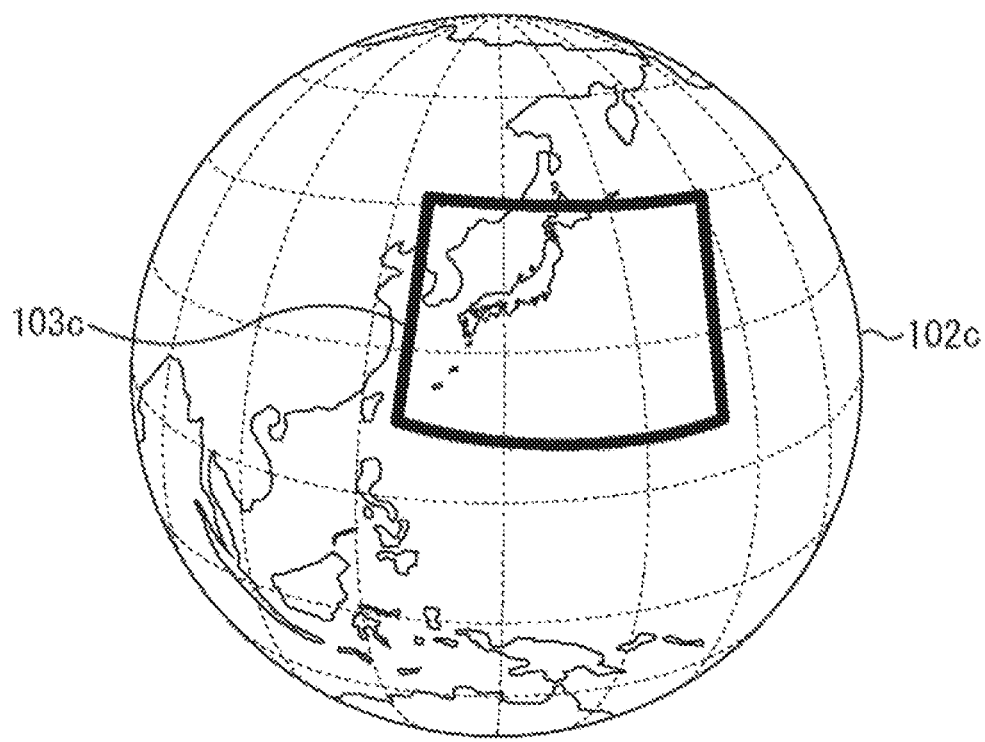
FIG. 7 is a view of another exemplary indicator.

An indicator 102c illustrated in FIG. 7 expresses an image including a wire-frame three-dimensional sphere perspectively converted in two dimensions, similarly to the indicator 102a illustrated in FIG. 5, but the image includes the entire-celestial-sphere picture pasted on the surface of the sphere as a texture. Thus, the entire-celestial-sphere picture may be pasted on the indicator 102 as a texture. A window 103c has a substantially quadratic shape, similarly to the window 103a illustrated in FIG. 5, but may have a curved shape, similarly to the window 103b illustrated in FIG. 6.

Figure 8:
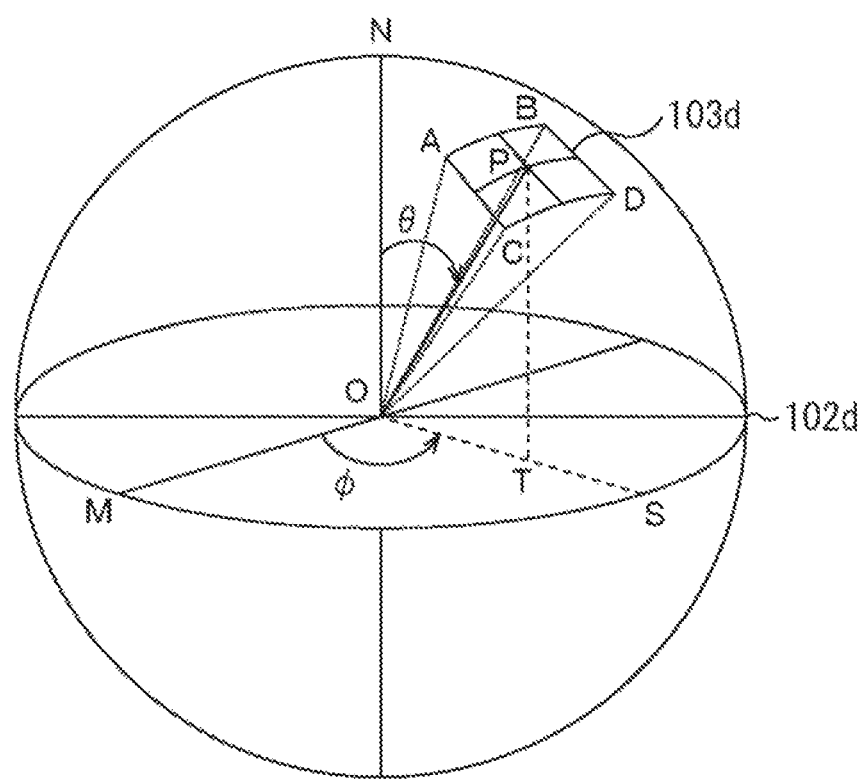
FIG. 8 is a view of another exemplary indicator.

An indicator 102d illustrated in FIG. 8 indicates the direction and the area of a window 103d to the indicator 102d expressed with a three-dimensional sphere, expressed with three-dimensional polar coordinates or the quaternions and a pyramid. Thus, numerical values expressing an angle and coordinates (text) may be displayed on the indicator 102d.

Note that the text may be, but not limited to the display of the indicator 102d illustrated in FIG. 8, displayed to, for example, the indicator 102a illustrated in FIG. 5.

Figure 9:
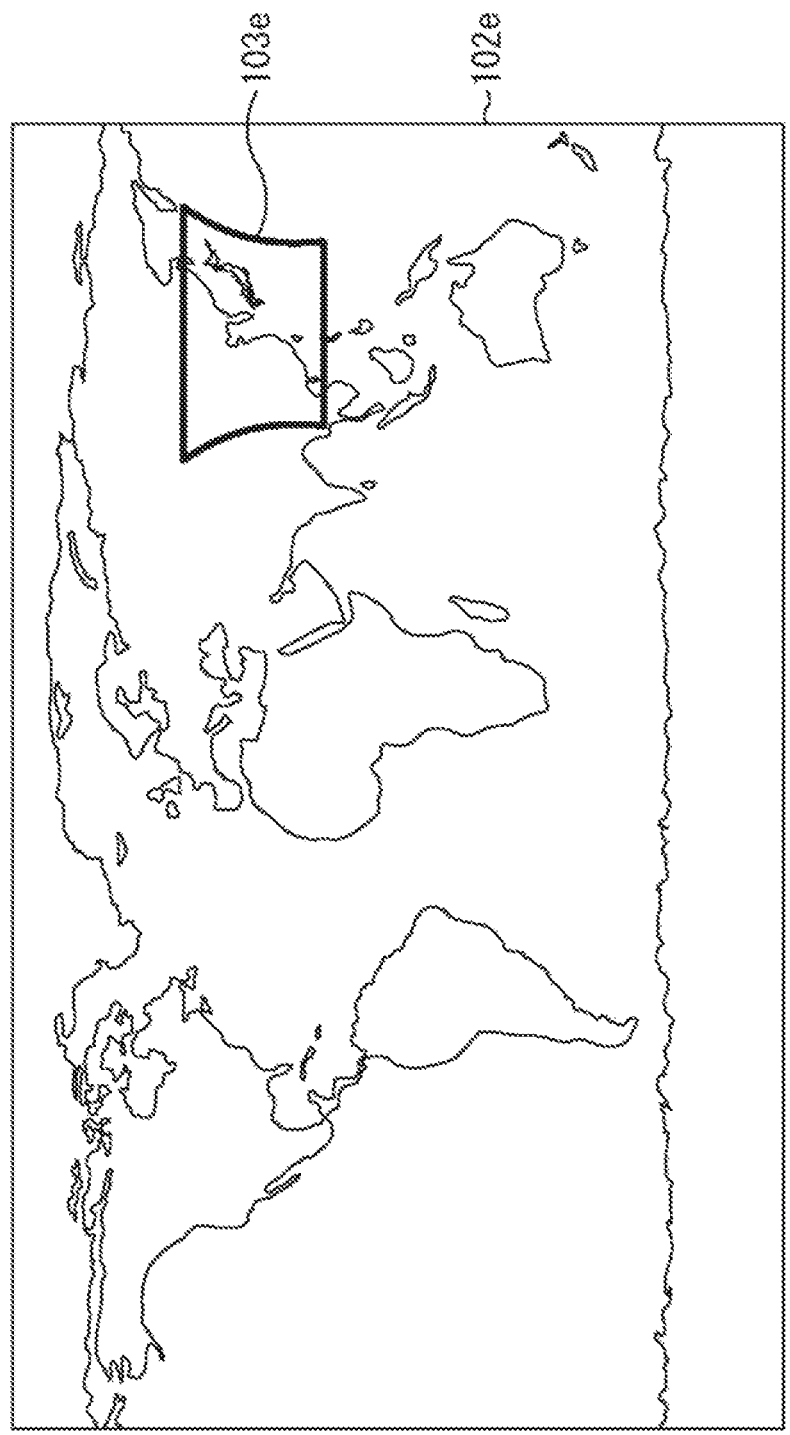
FIG. 9 is a view of another exemplary indicator.

An indicator 102e illustrated in FIG. 9 includes an image expressed with a two-dimensional figure. Some users are used to seeing, for example, two-dimensional maps, and there is a user who thinks that such a two-dimensional map is better for illustration of a visual-field range. Thus, the indicator 102e including a two-dimensional figure, may be prepared in order to support the user.

Figure 10:
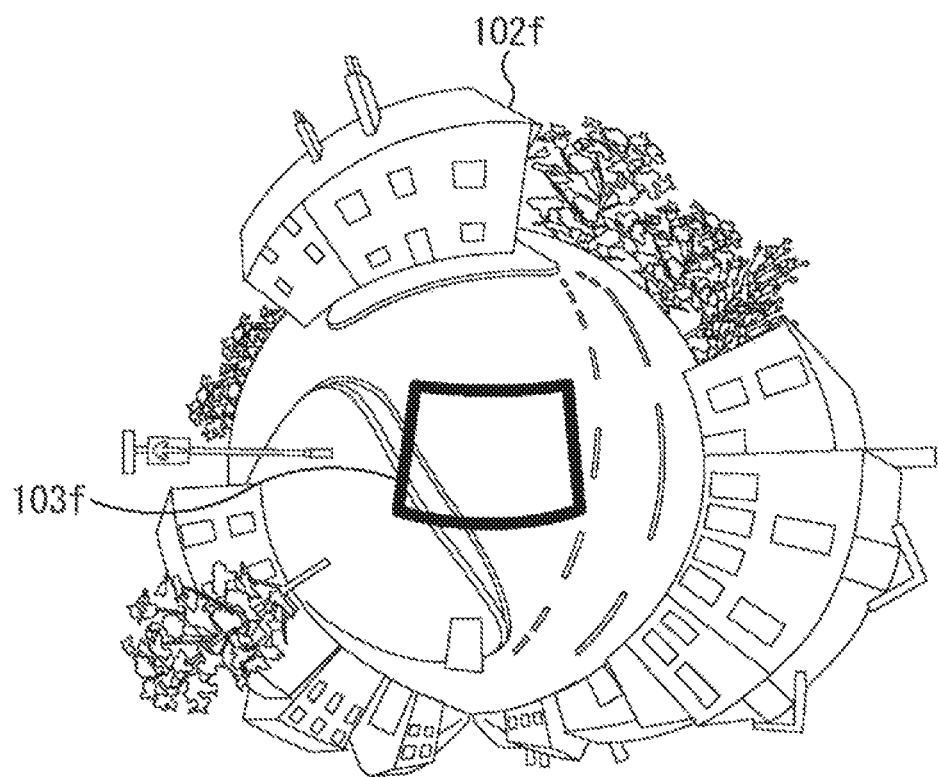
FIG. 10 is a view of another exemplary indicator.

An indicator 102f illustrated in FIG. 10 includes an image generated by stereographic projection in which a spherical surface is projected onto a plane. The entire-celestial-sphere picture may be projected onto a plane by stereographic projection, and the projected entire-celestial-sphere picture may be provided as the indicator 102f.

Thus, the indicator 102 includes an image including the entire-celestial-sphere picture (stereoscopic picture) projected in two dimensions (e.g., the indicator 102c illustrated in FIG. 7) or an image including the entire-celestial-sphere picture copied (e.g., the indicator 102a illustrated in FIG. 5).

For example, in a case where a texture is pasted on a predetermined shape as the indicator 102c illustrated in FIG. 7 (the sphere in FIG. 7), the shape to which the pasting is to be performed and the method of the pasting are not limited to the above sphere.

For example, application of equirectangular projection enables a texture to be pasted. Furthermore, application of cube projection enables projection display to each face of a cube or display as a two-dimensional developed view.

Furthermore, application of projection between regular polyhedrons, for example, application of projection from a regular tetrahedron to an icosahedron, enables projection display to each face of a polyhedron with central projection. Furthermore, application of stereographic projection enables, for example, display of only the Northern Hemisphere or the Southern Hemisphere as the indicator 102 or enables application of display of the Northern Hemisphere and the Southern Hemisphere up and down or right and left to the indicator 102.

<Processing According to Indicator Display>

Next, processing according to display of the indicator 102 will be described with reference to a flowchart illustrated in FIG. 11. For example, the processing is performed when the display unit 51 displays the screen illustrated in FIG. 3.

At step S101, the indicator setting unit 52 (FIG. 2) acquires indicator type information. For example, in a case where the indicators a to f illustrated in FIGS. 5 to 10 are provided as the indicator 102, the indicator type information is referred to when it is determined which indicator is to be used.

The indicator type information can be made such that the indicator type information set as default is used when the display starts. In a case where a setting is made as the default, the user is allowed to previously set indicator type, and information regarding the set indicator type can be used.

Furthermore, a setting may be made in accordance with an entire-celestial-sphere picture to be displayed. In a case where the indicator type information is set in accordance with the entire-celestial-sphere picture to be displayed, the indicator type information may be set with reference to information accompanied with the entire-celestial-sphere picture (meta information) to be acquired.

In a case where the information accompanied with the entire-celestial-sphere picture indicates a picture similar to a globe, the indication type information for setting the indicator 102c illustrated in FIG. 7 is set, for example. Furthermore, in a case where the information accompanied with the entire-celestial-sphere picture indicates, for example, a picture similar to a celestial sphere, the indicator type information for setting the indicator 102d illustrated in FIG. 8 from which a star can be located accurately, is set.

At step S102, the sensor 53 (FIG. 2) acquires attitude and zoom information. The information, for example, as to where the user is viewing and which part has been enlarged (which part the user is gazing at), is acquired.

At step S103, the indicator generation unit 55 (FIG. 2) generates an indicator image. For example, the indicator 102c illustrated in FIG. 7 is set as the indicator from the indicator type information, and the display position of the window 103c in the indicator 102c is set from, for example, the attitude and zoom information, so that the indicator image is generated. Furthermore, a texture is generated in accordance with the indicator type, and, for example, processing of performing pasting onto a three-dimensional sphere is also performed.

At step S104, the picture-data input unit 54 (FIG. 2) acquires compressed picture data of the entire-celestial-sphere picture. Note that, although the acquisition of the picture data at step S104 has been described here, in a case where the indicator type information is acquired from the picture data or information accompanied with the picture data, the picture data is acquired in processing prior to the processing at step S101. Thus, the processing based on the flowchart illustrated in FIG. 11 is exemplary, and a change, such as an appropriate change in order, can be made.

At step S105, the decoding unit 57 (FIG. 2) decodes the picture data input in the picture-data input unit 54, and then supplies decompressed picture data of the entire-celestial-sphere picture to the perspective conversion unit 56 (FIG. 2).

At step S106, the perspective conversion unit 56 generates an entire-celestial-sphere partial picture from the decoded entire-celestial-sphere picture, a 3D model, and positional information (a picture is displayed on the display unit 51 and is provided to the user). The perspective conversion unit 56 maps the entire-celestial-sphere picture onto the 3D mode (sphere), internally generates a virtual sphere pasted with the picture, generates a perspective conversion matrix from, for example, the attitude and zoom information, performs perspective conversion processing, and generates the entire-celestial-sphere partial picture.

At step S107, the picture combination unit 58 (FIG. 2) combines the indicator image generated by the indicator generation unit 55, into a predetermined region, for example, into an upper left region in the entire-celestial-sphere partial picture (image) generated by the perspective conversion unit 56, to generate the entire-celestial-sphere picture having the indicator.

At step S108, the display unit 51 (FIG. 2) displays the entire-celestial-sphere picture having the indicator (picture) generated by the picture combination unit 58. For example, the display unit 51 displays the entire-celestial-sphere picture having the indicator as illustrated in FIG. 3.

<Processing According to Indicator Switching>

Figure 12:
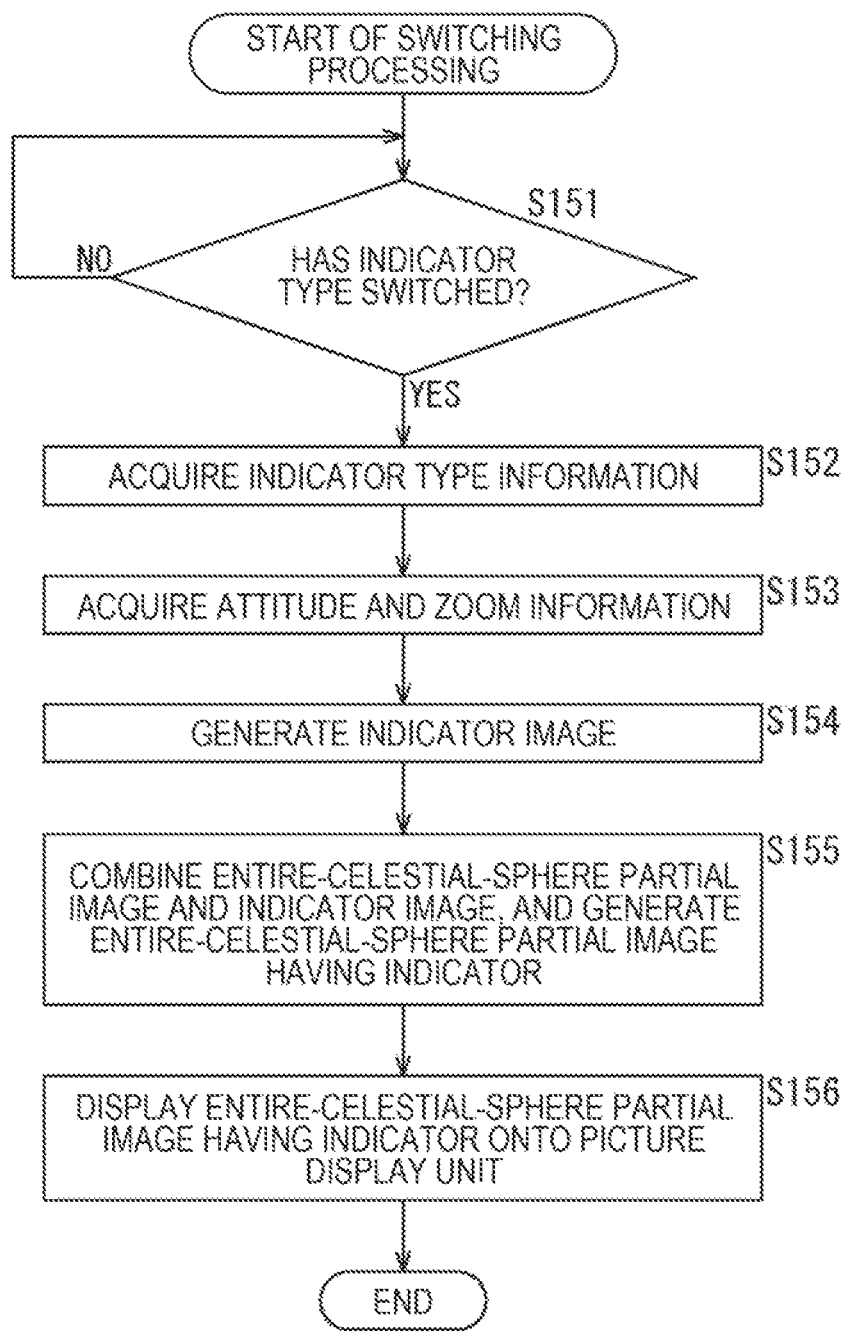
FIG. 12 is a flowchart for describing processing according to display switching.

The indicator 102 displayed on the display unit 51 can switch due to the processing. The processing according to the switching of the indicator 102, will be described with reference to a flowchart illustrated in FIG. 12.

At step S151, it is determined whether or not the indicator type has switched. For example, when the user issues an instruction for a change from the indicator 102 being displayed to another indicator 102, it is determined that the indicator type has switched.

For example, the user operates a button of issuing an instruction for indicator switching, in a device, such as a controller, to issue an instruction for indicator switching. Alternatively, for example, the user makes a gesture assigned for indicator switching, to a motion sensor, to issue an instruction for indicator switching.

Alternatively, for example, the user utters a phrase or a melody assigned for indicator switching, to a voice sensor, to issue an instruction for indicator switching.

Alternatively, the user performs, for example, sensor input assigned for indicator switching, to a wearable device, to issue an instruction for indicator switching. Examples of the sensor input include attitude control, pressure, biological reaction, and the like.

Furthermore, with acquisition of positional information, such as GPS, when the user enters a specific region, it may be determined that an instruction for indicator switching has been issued. Furthermore, it may be determined that an instruction for indicator switching has been issued, in response to a change in environment around the user, such as weather, temperature, humidity, atmospheric pressure, or the amount of light.

Furthermore, when a change is made to, for example, the type or contents of the picture, it may be determined that an instruction for indicator switching has been issued.

The determination processing at step S151 is repeated until it is determined that the indicator type has switched, at step S151. In a case where it is determined that the indicator type has switched, the processing proceeds to step S152.

Figure 11:
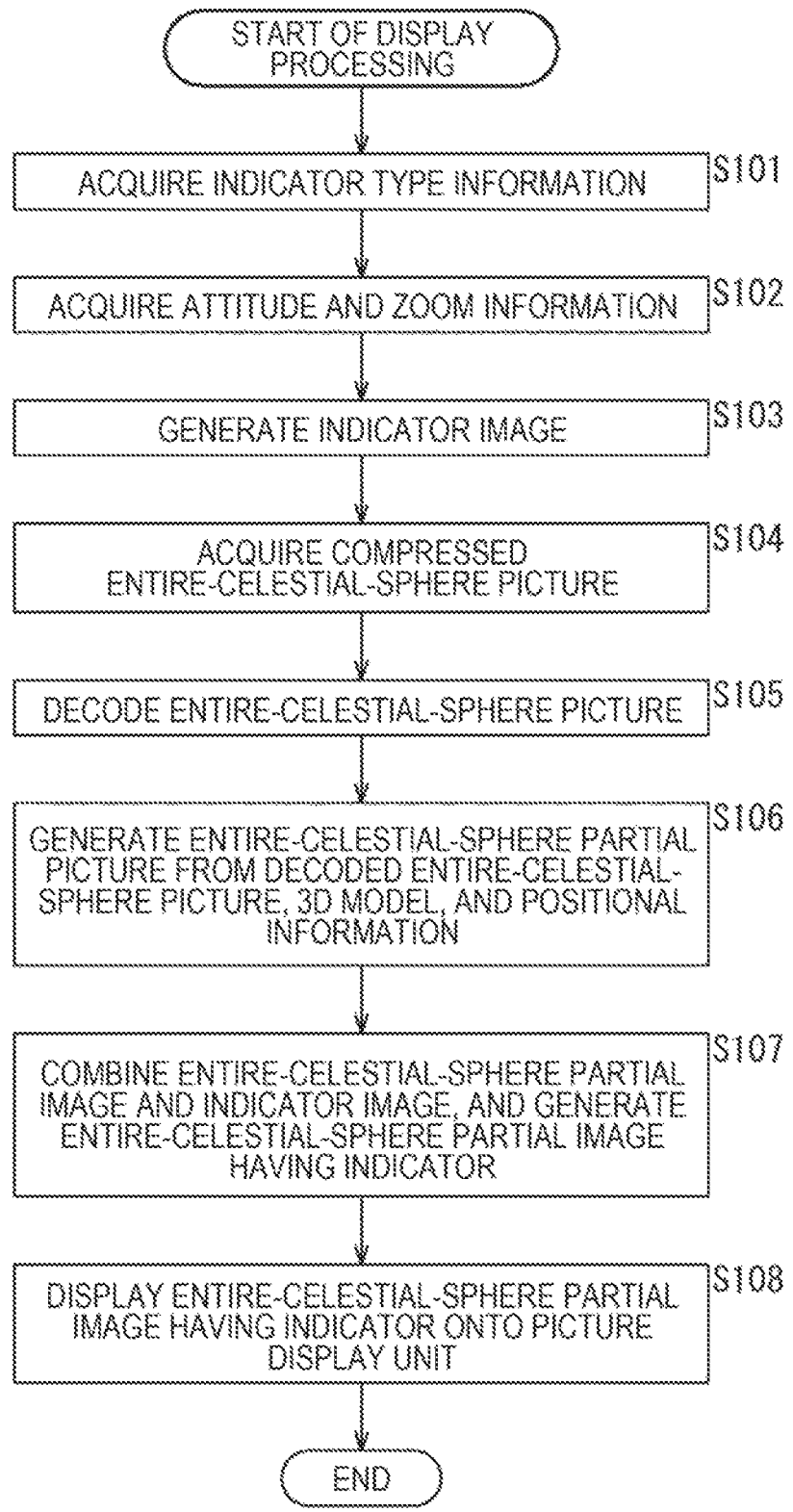
FIG. 11 is a flowchart for describing processing according to display.

The processing from steps S152 to S156 is similar to that from steps S102 to S108 illustrated in FIG. 11 (except steps S104 and S105), and thus the description thereof will be omitted. In other words, on the basis of the indicator type of the switching destination, an indicator image is generated and the entire-celestial-sphere partial image having the indicator is generated.

The switching of the indicator type due to the processing, switches the display from the indicator 102 being displayed to another indicator 102 in the indicators 102a to 102f illustrated in FIGS. 5 to 10 as described above, for example.

For example, in a case where the user issues an instruction for switching to the indicator 102c pasted with the texture illustrated in FIG. 7 while the wire-frame indicator 102a illustrated in FIG. 5 is being displayed, the indicator 102 displayed on the display unit 51 switches from the indicator 102a to the indicator 102c.

Furthermore, for example, in a case where the visual-field picture 101 including a picture of walking downtown, switches to a picture of walking in a building after entry into the building, a spherical indicator 102 causing the image of the earth (e.g., the indicator 102a illustrated in FIG. 5) may switch to a cubic indicator 102 causing the image of a building (in-room) (not illustrated).

Thus, the indicator 102 may switch in accordance with the visual-field picture 101. Provided may be a mechanism of presenting, when, for example, a map, geographical data, or the like is displayed, alternatives, such as equirectangular projection and stereographic projection, to the user such that the user is guided to display of the indicator 102 with such projection.

Furthermore, in case where indicator size is included as the indicator type, a change may be made in size as the switching of the indicator 102.

Furthermore, as the switching of the indicator 102, the indicator 102 being displayed can change to the indicator 102 not being displayed. Conversely, the indicator 102 not being displayed can switch to the indicator 102 being displayed. The display and non-display of the indicator 102 can be performed in accordance with an instruction of the user.

Furthermore, for example, in a case where a predetermined time has elapsed after the indicator 102 is displayed, the indicator 102 may disappear. Alternatively, the indicator 102 may be displayed small. In this case, the processing at step S151 includes: determining whether or not the predetermined time has elapsed after the display of the indicator 102; and determining that the indicator type has switched, in a case where it is determined that the predetermined time has elapsed.

Furthermore, for example, in a case where the user issues an instruction for display of the indicator 102 (large display) while the indicator 102 is not being displayed (being displayed small), the indicator 102 may be displayed. Furthermore, for example, when the amount of movement of the user increases, the indicator 102 may be redisplayed.

The indicator 102 is displayed as means of allowing the user to verify which part in the entire-celestial-sphere picture the user is viewing. The user verifies the indicator 102, so that the user can verify the position of the user itself. For example, while the user is not moving much (when the amount of movement is small), it is considered that the user enjoys a picture of the neighborhood. Meanwhile, while the user is moving (when the amount of movement is large), it is can be estimated that the user is thinking about desiring to move to a different position.

For example, when it can be determined that the user is thinking about desiring to move to a different position, display that assists the movement of the user is performed with the display of the indicator 102. Furthermore, as described later, information can be superimposed on the indicator 102. When it can be determined, for example, that the user desires to move to a location at which information is present or that the user has started searching for some sort of information, the indicator 102 may be displayed.

In this case, the processing at step S151 includes: determining whether or not the movement speed of the user (the amount of movement) has exceeded a threshold value; and determining that the indicator type has switched, in a case where it is determined that the movement speed of the user has exceeded the threshold value.

Note that, the movement speed (the amount of movement) in this case may be a numerical value measured in movement in the space displayed on the display unit 51, or may be a numerical value measured in accordance with the distance the user has walked practically (movement of the legs at the location).

Furthermore, the indicator type may switch with the visual line of the user as a trigger. For example, in a case where the indicator 102 is being displayed in the region at which the user is gazing, the indicator 102 is displayed in the region at which the user is not gazing such that the indicator 102 is not displayed in the part at which the user is gazing. In this case, display position is required at least to be included as one type in the indicator type.

Furthermore, in a case where the indicator 102 is being displayed in the region at which the user is gazing, the indicator 102 may be deleted (be made faint). Then, when the gaze moves to a different region, the indicator 102 may be redisplayed.

Furthermore, while the user is gazing at a region in which the indicator 102 is to be displayed, the indicator 102 may be displayed in the region. Furthermore, immediately after the visual-line direction of the user changes by a certain amount, the indicator 102 may be displayed only during a certain time.

Furthermore, following a change in the visual-line direction of the user, the display position of the indicator 102 may be changed. For example, in a case where the visual line of the user moves from the upper left to the upper right, the display of the indicator 102 may change from the upper left to the upper right. Alternatively, in a case where the visual line of the user moves from the upper left to the upper right, the display of the indicator 102 may change from the upper right to the upper left.

Thus, in a case where the display position of the indicator 102 changes with the visual line of the user (the indicator type switches), the processing at step S151 includes: detecting the visual line of the user; detecting the region ahead of the visual line; measuring the time during the gaze; determining whether or not a predetermined condition is satisfied, on the basis of a result of the detection and the measurement; and determining that the indicator type has switched, in a case where it is determined that the predetermined condition is satisfied.

Furthermore, the type of the indicator 102 may change in accordance with the visual line of the user. For example, when it can be determined that the user is gazing at the indicator 102, it may be determined that an instruction for a change of the type of the indicator 102 has been issued, and a change may be made from the indicator 102 displayed at the point in time to a different type of indicator 102.

For example, in a case where the indicator 102 at which the user is gazing is the indicator 102c illustrated in FIG. 7, the display may switch to the indicator 102e illustrated in FIG. 9.

Moreover, in a case where the user continues with the gaze, the display may further switch to a different indicator 102. In other words, while the user is gazing at the indicator 102, the type of the indicator 102 may switch sequentially and the user may stop the gaze at the point in time at which a desired indicator 102 is displayed, such that the desired indicator 102 can be selected.

Furthermore, for example, the size of the indicator 102 may change with the visual line of the user. For example, when it can be determined that the user is gazing at the indicator 102, the indicator 102 may be displayed large.

Note that the visual line may be detected by detection of the direction of the iris of the user. For example, in a case where the information processing device 10 (FIG. 1) is a terminal, such as a tablet, an image pickup unit that captures the face of the user (mainly, eyes) is provided as the sensor 53. An image captured by the image pickup unit is analyzed so that the visual line of the user can be acquired.

Furthermore, in a case where the information processing device 10 is a device to be worn on the head of the user, such as the head-mounted display, for example, an attitude sensor that detects the orientation of the face of the user (head) is provided as the sensor 53. The orientation of the face of the user detected by the attitude sensor, can be detected as the direction of the visual line.

Alternatively, in a case where the information processing device 10 is a device, such as the head-mounted display, there is a possibility that the actual orientation of the face is not identical to a direction in which the user is facing in the picture viewed by the user through the head-mounted display (e.g., virtual space). Therefore, the direction in which the user is facing in the virtual space (the direction of the visual line) may be detected.

In a case where the information processing device 10 is a device, such as the head-mounted display, an infrared LED and an optical sensor are provided inside so that the visual line can be detected by the infrared LED and the optical sensor.

A general technique can be applied to the visual-line detection. For example, an eyeball is irradiated with polarized infrared light, a corneal reflected image of the infrared light is captured, and the pupil and a luminous point necessary for estimating a visual-line direction are detected from the captured image. Then, an optical axis is estimated and a visual axis (visual-line direction) is estimated, by a geometric method with a three-dimensional eye-ball model, on the basis of the pupil and the corneal reflected image that have been detected.

A display method different from the display methods described above can be applied for the display of the indicator 102. For example, in a case where the indicator 102 being displayed moves to a different region, a gradual change may be made in the depth of the indicator 102 being displayed and the display region may move such that the indicator 102 being displayed is displayed faintly and is deleted and then is displayed faintly and is displayed deeply at the destination.

Furthermore, the indicator type may be set with the age of the user. For example, when it is determined that the user is a child, as the indicator 102 from which a position can be verified intuitively, for example, the indicator 102e illustrated in FIG. 9 may be set as the indicator type.

Furthermore, for example, in a case where it is determined that the user is an elderly person, the indicator 102 may be displayed large.

<Processing to Indicator>

Next, a case where performance of a predetermined operation to the indicator 102 switches the picture of the visual-field picture 101, will be described.

Figure 13:
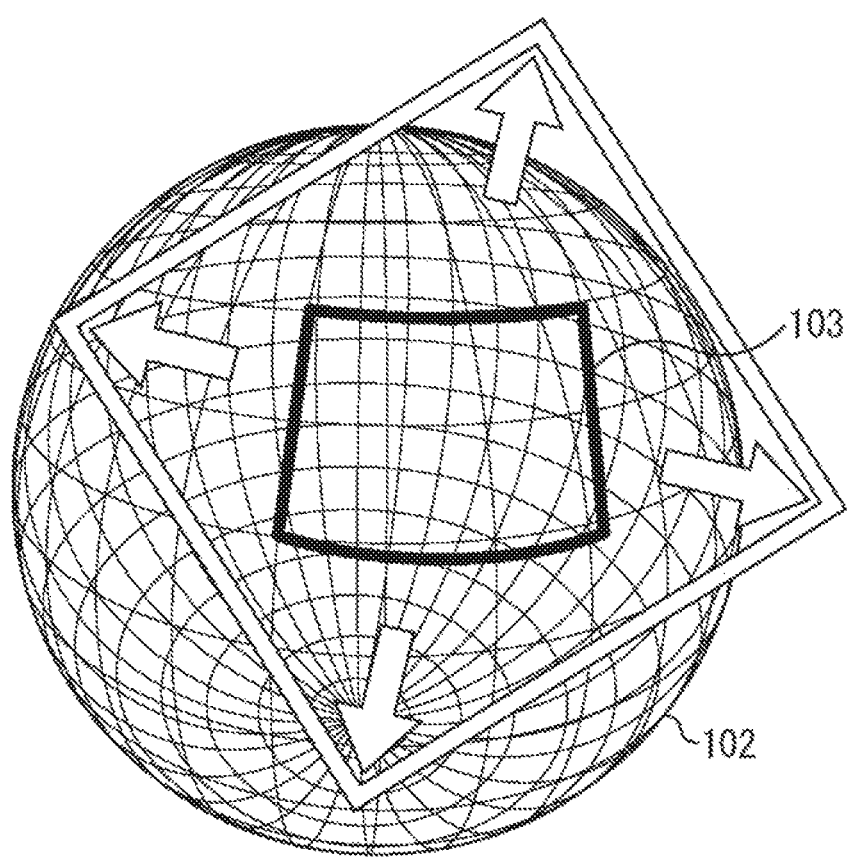
FIG. 13 is a view for describing an operation to an indicator.

As illustrated in FIG. 13, the window 103 displayed on the indicator 102 is enlarged or reduced, so that the visual-field picture 101 switches in accordance with the enlargement or the reduction. For example, the user grabs part of the window 103 (a side of the window 103) so that the size of the window 103 can change to a desired size.

Because the change of the size of the window 103 changes the range of the image in the window 103 in the entire-celestial-sphere picture, the visual-field picture 101 changes in accordance with the change. Thus, the user operates the window 103 so that the range displayed as the visual-field picture 101 can be enlarged or reduced.

Note that, enlargement of the window 103 enlarges the region clipped as the visual-field picture 101 in the entire-celestial-sphere picture, and thus, a subject, such as a person or a building, is reduced in the image displayed as the visual-field picture 101.

Similarly, reduction of the window 103 reduces the region clipped as the visual-field picture 101 in the entire-celestial-sphere picture, and thus, a subject, such as a person or a building, is enlarged in the image displayed as the visual-field picture 101.

Furthermore, in a case where the user moves the window 103 on the indicator 102, the image of the visual-field picture 101 changes to the image displayed in a region to which the window 103 has moved, in the entire-celestial-sphere picture. Thus, the user operates the window 103 so that the part displayed as the visual-field picture 101 can change.

FIG. 13 exemplifies a case where the window 103 moves with the image in the indicator 102, fixed. In other words, the example is a case where display of giving the user a feeling that the window 103 moves on the surface of the sphere with the sphere serving as the indicator 102, fixed, is performed.

Figure 14:
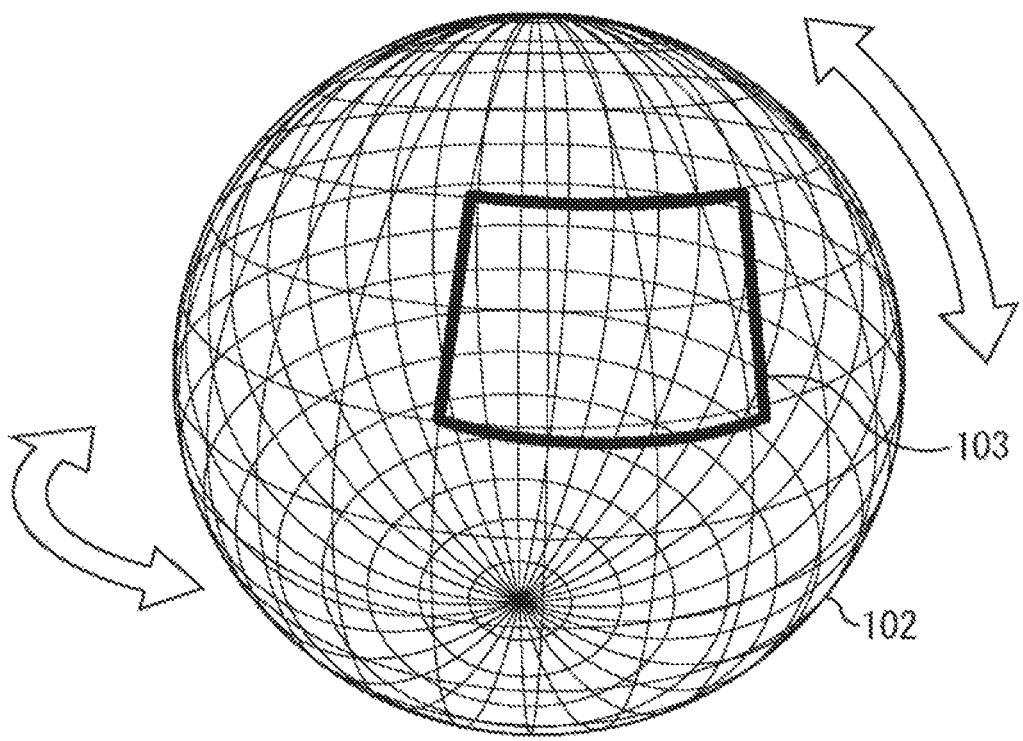
FIG. 14 is a view for describing an operation to the indicator.

As illustrated in FIG. 14, an operation, such as rotation, may be performed by grabbing the indicator 102. The user grabs any position of the indicator 102 and moves the position up and down or right and left so that the indicator 102 can rotate.

In a case where the window 103 is fixed, because rotation of the indicator 102 changes the image displayed in the window 103 in the entire-celestial-sphere picture, the visual-field picture 101 changes along with the change.

However, in a case where the visual-field picture 101 changes meeting the rotation of the indicator 102, there is a possibility that a rapid change occurs in the visual field and the user gets sick (so-called VR sickness). Thus, processing of preventing the sickness from being induced, may be performed.

In order to avoid induction of VR sickness due to a rapid change in the visual field, for example, processing of darkening the screen temporarily may be performed until the visual field stabilizes.

FIG. 14 exemplifies that the image in the indicator 102 switches and the visual-field picture 101 switches with the window 103 fixed in the indicator 102. In other words, the example is that display of giving the user a feeling that the sphere serving as the indicator 102 rotates with the window 103 fixed, is performed.

Figure 15:
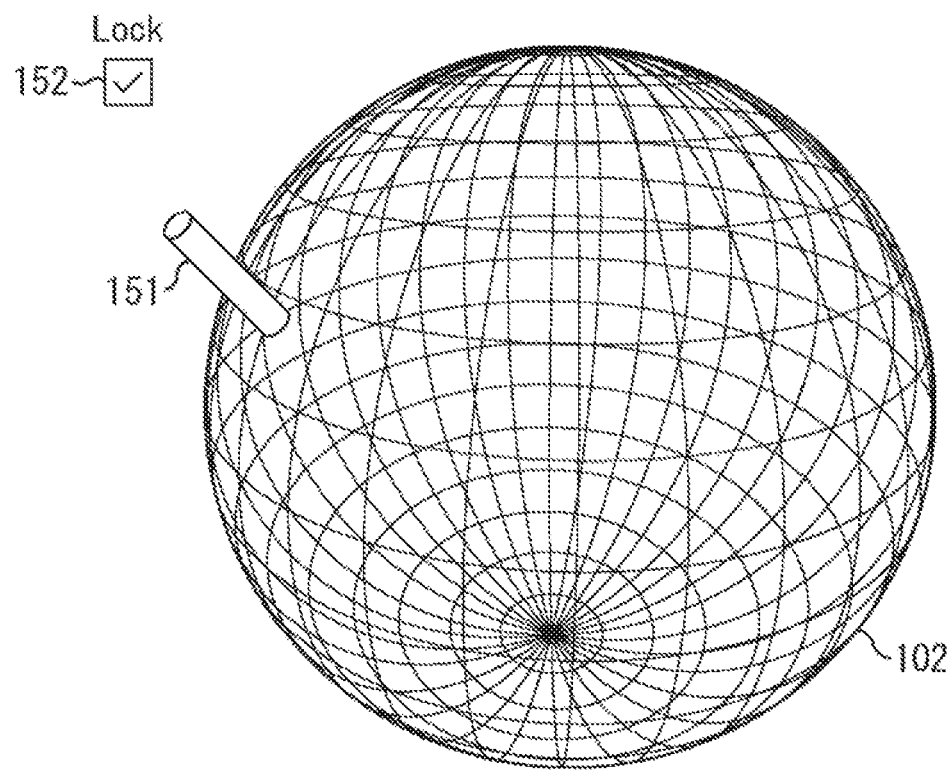
FIG. 15 is a view for describing an operation to the indicator.

An icon 151 is displayed on the indicator 102 illustrated in FIG. 15. As described later, the icon 151 is a mark indicating that some sort of information is present at the position of the icon 151. The user sets the icon 151 (information) on the indicator 102 or operates the icon 151 of the indicator 102 so that the user can browse the information.

In order to prevent the indicator 102 from rotating when the user desires to perform an operation to the icon 151, a check box 152 of "LOCK" is displayed in proximity to the indicator 102. When the check box 152 has a check, the indicator 102 is locked so as not to rotate.

For example, in a case where grabbing the icon 151 enables holding of the icon 151, when the user operates with the check box 152 having the check, the icon 151 is grabbed. Meanwhile, when an operation is performed with the check box 152 having no check, processing is performed with the indicator 102 regarded as having been grabbed, so that an operation, such as rotation of the indicator 102, is performed.

In this case, when the indicator 102 rotates, the window 103 moves along with the rotation. In other words, because the relative position between the indicator 102 and the window 103 is constant, no change is made to the image in the window 103.

In this case, the window 103 is movable and the indicator 102 is also movable. In a case where the indicator 102 itself is operated, the image in the indicator 102 changes in accordance with an instruction of the user, and the display position of the window 103 changes, following the change. However, the visual-field picture 101 does not change.

Thus, the display of the icon 151 on the indicator 102 and the provision of the check box 152 allow an operation to be performed to the icon 151. For example, the type (shape) or color of the icon 151 arranged on the indicator 102 can be changed or can be deleted. Furthermore, for example, a new icon 151 can be arranged on the indicator 102 (addition of new information).

Furthermore, the icon 151 having a shape or a color previously linked with a predetermined meaning, may be allowed to be arranged at a desired position of the user. Furthermore, in that case, additional information for direction can be given (annotation).

<Dive-in Mode>

Moreover, an operation can be performed with the indicator 102 rendered in enlarged display. Here, it is referred to as a dive-in mode.

Figure 16:
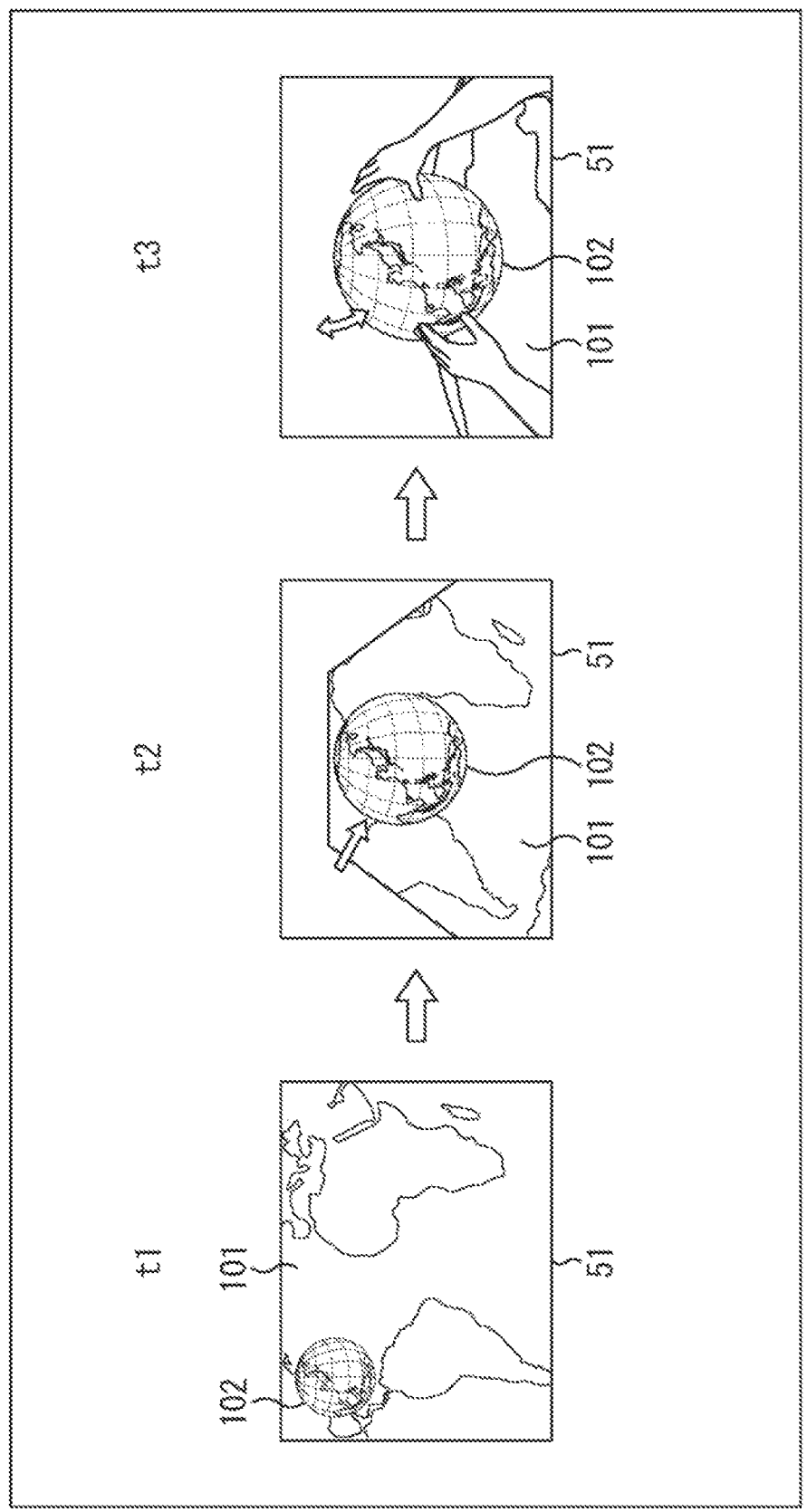
FIG. 16 is a view for describing a dive-in mode.

FIG. 16 is a view of exemplary screens displayed on the display unit 51 in the dive-in mode. At time t1, the display unit 51 displays the visual-field picture 101 and displays the indicator 102 at the upper left of the visual-field picture 101.

It is assumed that, during the display, the user operates to hold the indicator 102 and to pull the indicator 102 to a central portion. The performance of the operation to the indicator 102 at time t2, moves the indicator 102 to the central portion of the visual-field picture 101 while enlarging the indicator 102 gradually.

Note that, instead of the operation, for example, when a button for transition to the dive-in mode is displayed and the button is operated, an animation in which the indicator 102 moves to the central portion while enlarging gradually, may be performed.

An animation in which the visual-field picture 101 itself falls backward while the indicator 102 is moving to the central portion of the visual-field picture 101, is made.

At time t3, the indicator 102 that has moved to the central portion of the visual-field picture 101, is rendered in enlarged display at the position of the central portion. At the time t3, the visual-field picture 101 that has fallen down to the back side, is displayed on the lower side of the indicator 102.

Thus, in the transition to the dive-in mode, the animation in which the visual-field picture 101 falls in the depth direction and is displayed at the feet, is performed and additionally the animation in which the indicator 102 moves to the center of the screen while enlarging, is performed.

Thus, the visual-field picture 101 and the indicator 102 change the display positions in the dive-in mode. In other words, although the visual-field picture 101 has been displayed as the main and the indicator 102 has been displayed as the sub at the point in time before the dive-in mode, the visual-field picture 101 has been displayed as the sub and the indicator 102 has been displayed as the main in completion of the dive-in mode.

Furthermore, an image expressing the hands of the user may be displayed as illustrated in the exemplary screen at the time t3 of FIG. 16. For example, in a case where the information processing device 10 is the head-mounted display, display of the hands of the user in proximity to the indicator 102 in the screen, can give an interval as if the user operates the indicator 102 in front.

An image pickup unit may capture the hands of the user and the captured image may be combined into the screen, so as to be expressed, or artificial user's hands created with CG may be displayed in the screen. Furthermore, a sensor capable of detecting the fingertips of the user is used in parallel, and information regarding the fingertips of the user acquired from the sensor is reflected in the image of the fingers of the user in the screen.

The user operates the indicator 102 rendered in the enlarged display, so that the user can find a position to be browsed desirably or find information.

Note that, in a case where, for example, the indicator 102 rotates in the dive-in mode, the visual-field picture 101 displayed in the background does not change.

<Little-Planet Mode>

Moreover, walking can be performed in the indicator 102 rendered in enlarged display. Here, it is referred to as a little-planet mode. In the little-planet mode, the indicator 102 is displayed as a little planet at the feet of the user in the screen.

Figure 17:
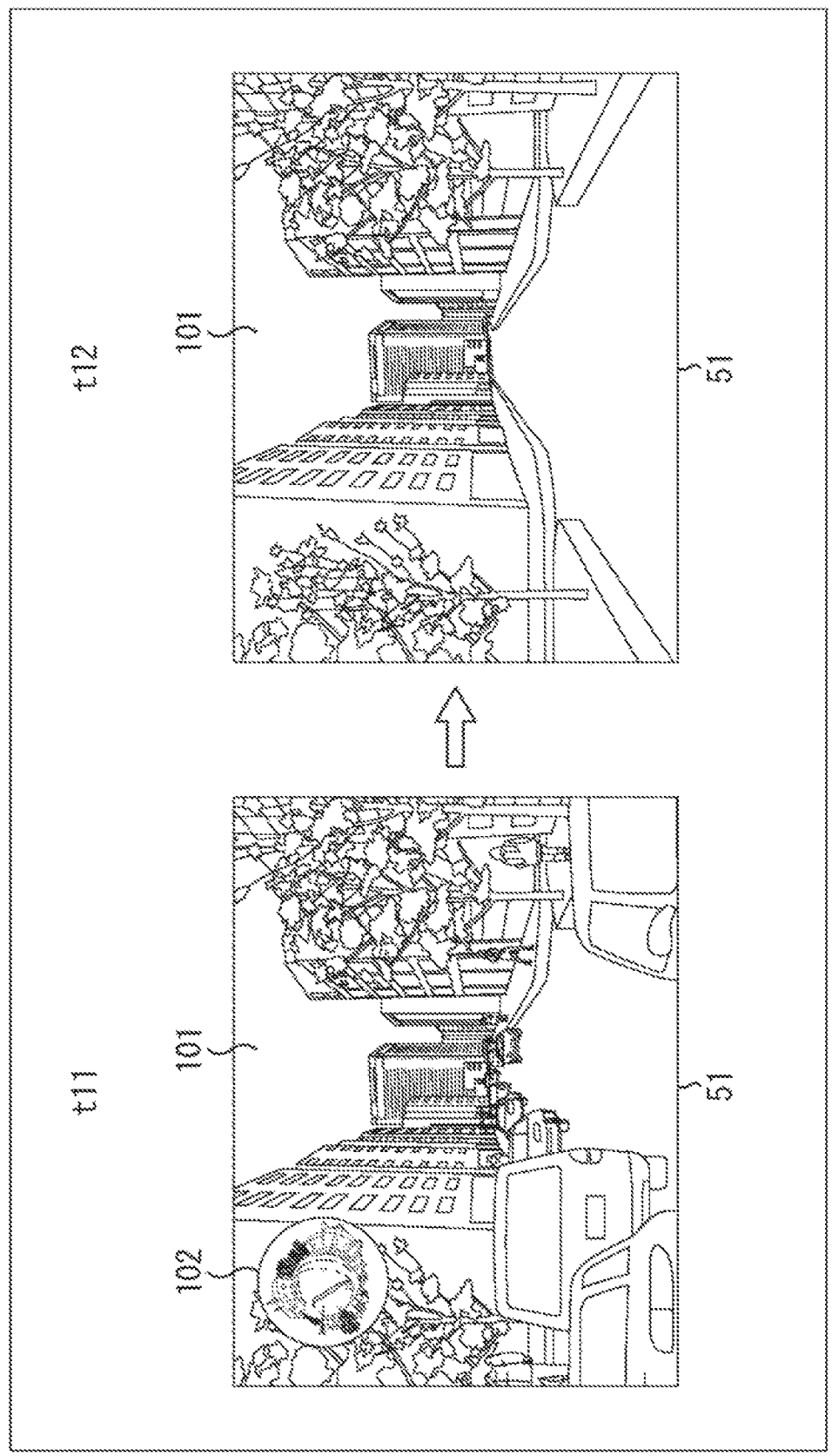
FIG. 17 is a view for describing a little-planet mode.

FIG. 17 is a view of exemplary screens displayed on the display unit 51 in the little-planet mode. At time t11, the display unit 51 displays the visual-field picture 101 and displays the indicator 102 at the upper left of the visual-field picture 101. The indicator 102 that is the indicator 102*f* illustrated in FIG. 10, has the entire-celestial-sphere picture projected onto a plane by stereographic projection.

For example, in a case where an operation in which the indicator 102 is held and is pulled to a central portion, is performed at the time t11, similarly to the dive-in mode described with reference to FIG. 16, a transition to the little-planet mode is made. Alternatively, for example, when a button for transition to the little-planet mode is displayed and the button is operated, a transition to the little-planet mode may be made.

When a transition to the little-planet mode is made at time t12, display is performed such that the user exists in the indicator 102 (in the little planet). In other words, first, the indicator 102 is rendered in enlarged display. Furthermore, the visual-field picture 101 fades out to be in non-display.

With the little planet (indicator 102) as the ground, the visual field of the user moves to the position at which the user stands on the ground. The user can walk in the little planet with the visual field remaining.

Figure 18:
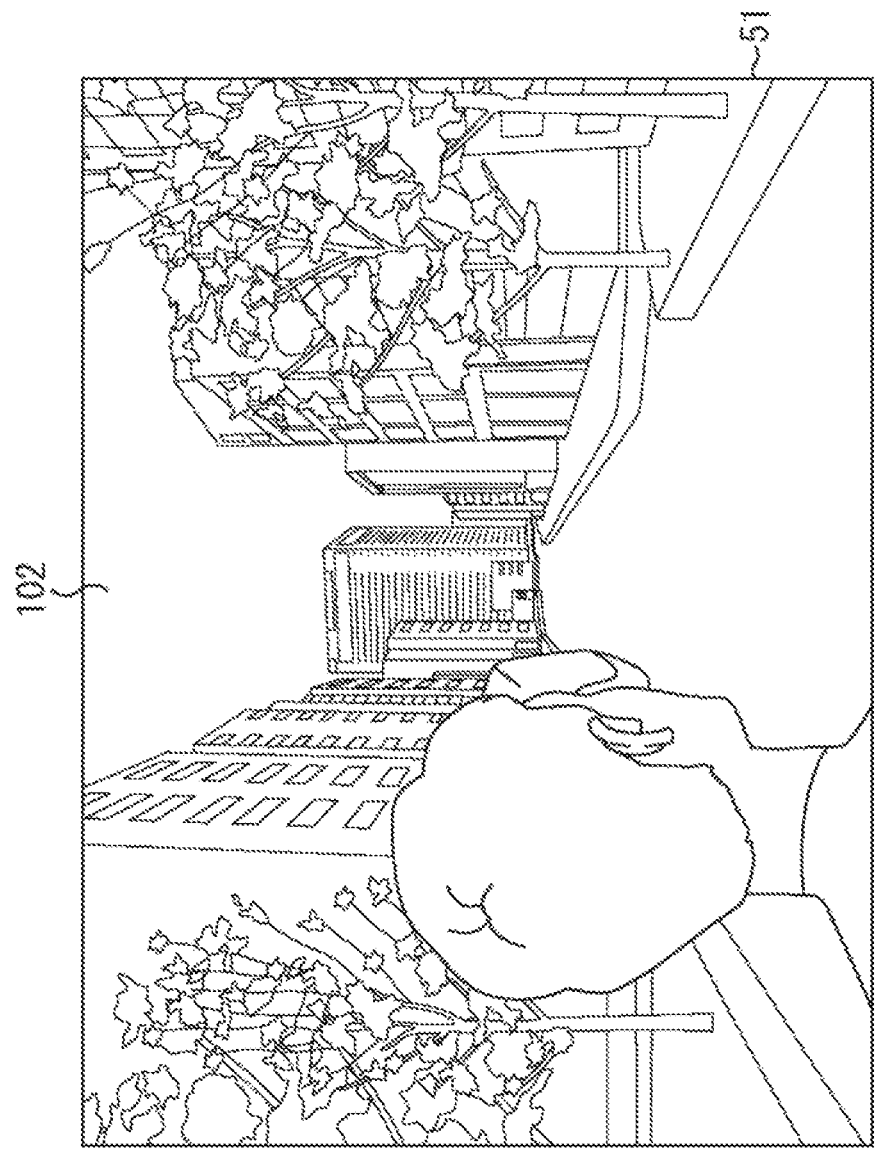
FIG. 18 is a view for describing display in the little-planet mode.
Figure 19:
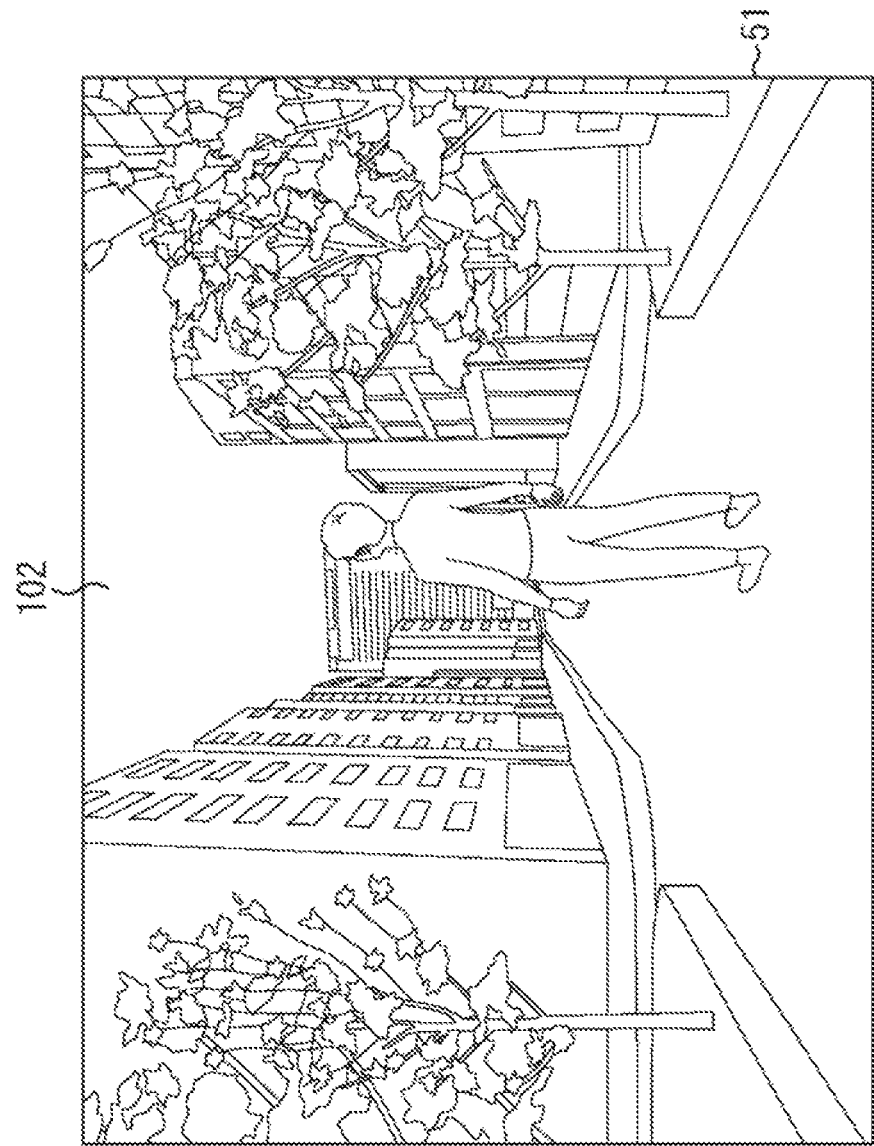
FIG. 19 is a view for describing display in the little-planet mode.

Note that, display of expressing the user may be performed as illustrated in FIGS. 18 and 19 such that the user can realize further that the user exists in the little planet. A head expressing the user is displayed in the example illustrated in FIG. 18. Furthermore, a person expressing the user is displayed in the example illustrated in FIG. 19. Thus, the display of the head or the person (whole body) expressing the user in the indicator 102 being displayed, can provide a sense as if the user exists in the little planet, more realistically.

Furthermore, in a case where the information processing device 10 is the head-mounted display, without the display of the head or the person expressing the user illustrated in FIG. 18 or 19, only visible scenery may be displayed as illustrated in FIG. 17. Even in that case, for example, when the user faces downward (views the ground), the feet or the shadow of the user may be displayed. Furthermore, the image of the feet may be a solely projected image.

Thus, the user can walk in the indicator 102 in the little-planet mode. For example, in a case where the indicator 102 includes a globe, the user can be provided with a sense that the user walks on the earth, in the little-planet mode. Furthermore, the user can go on foot to a location to which the user desires to go (e.g., a country), while walking on the earth.

Then, in a case where the user has moved to a desired location, return from the little-planet mode to a normal mode, enables walking to start at the desired location.

<Information Display onto Indicator>

Information can be superimposed onto the indicator 102 as described with reference to FIG. 15.

As information to be superimposed onto the indicator 102, a two-dimensional-shaped icon or a three-dimensional-shaped icon that expresses the presence of information, can be provided. For example, an icon having a shape from which the user can recognize the presence of information at a glance when the icon is superimposed on the indicator 102, can be provided, such as a cylindrical shape as an icon 151*a* illustrated in FIG. 20.

Furthermore, the information includes an orientation, a map symbol, and a landmark on the map, for example, the presence of a public structure, a commercial facility, or the like, and icons expressing those can be superimposed on the indicator 102 as the information. For example, an icon having a shape expressing a tower, such as an icon 151*b* illustrated in FIG. 20, can be provided.

Figure 20:
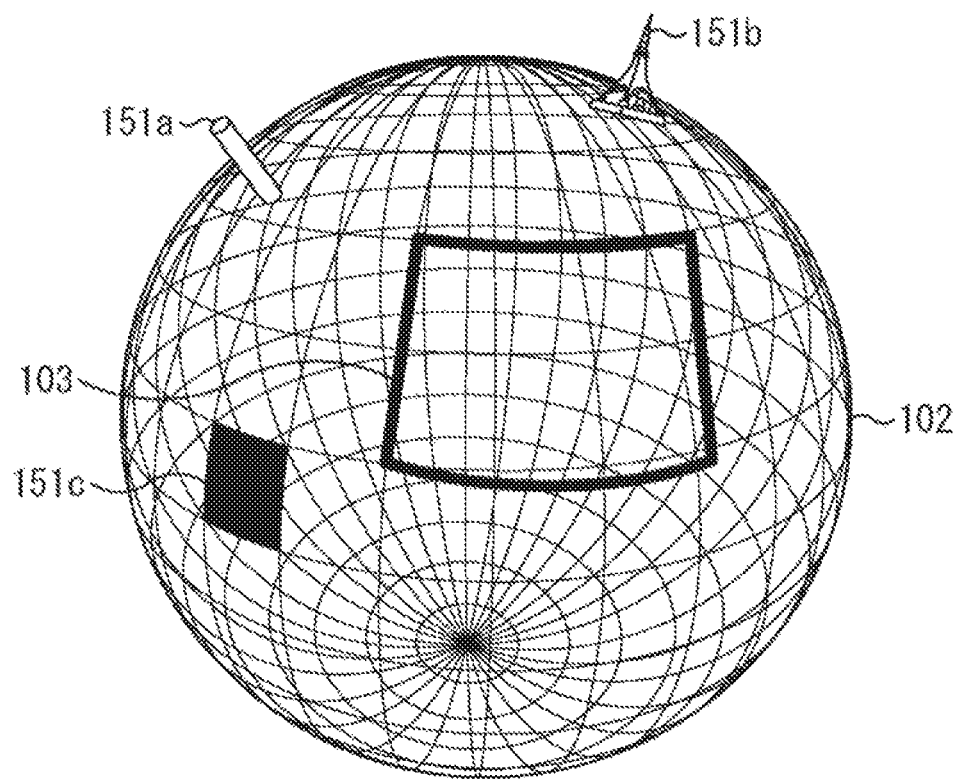
FIG. 20 is a view for describing an icon.

For example, as illustrated in FIG. 20, the icon 151*b* is displayed on the indicator 102, and, for example, a public structure or a commercial facility is present at the position of the display of the icon 151*b*. When the user desires to view the public structure or the commercial facility, performance of a predetermined operation to the icon 151*b* enables the user to view the public structure or the commercial facility.

Furthermore, for example, the visual field of a different user who is viewing the same content simultaneously, may be superimposed on the indicator 102 as the information. Furthermore, for example, the visual field viewed by the user itself or the different user in the past may be superimposed on the indicator 102 as the information. The color or the depth of an icon (region) may change in accordance with the frequency of reference or the number of times of reference.

For example, as the icon 151*c* illustrated in FIG. 20, the region of the indicator 102 corresponding to the part of the visual field of the different user who is viewing the same content simultaneously, is filled and is displayed.

Furthermore, for example, as the icon 151*c* illustrated in FIG. 20, the region of the indicator 102 corresponding to the part of the visual field viewed by the user itself or the different user in the past, is filled and is displayed. The icon 151*c* can be displayed in color or depth corresponding to the frequency of reference or the number of times of reference.

Thus, for example, in a case where the visual field viewed by the user itself is displayed as the icon 151, the region in which the window 103 has moved on the indicator 102 is displayed as a history. Thus, leaving the region viewed after the user starts reproduction or within a certain time (history) on the indicator 102 enables the user to recognize which part of the entirety the user has already viewed.

Note that the display of the history may be highlighted for a certain time. Furthermore, the display of the history may be performed with a change made in depth in accordance with the elapse of time or the frequency of viewing.

Furthermore, in a case where, for example, a celestial-sphere picture is provided as the visual-field picture 101, the positions of celestial bodies, such as constellations and planets, may be displayed on the indicator 102 as the information. Thus, in a case where, for example, the information regarding a constellation has been superimposed on the indicator 102, when the user performs a predetermined operation, such as clicking of the constellation on the indicator 102, the stars included in the constellation may be linked together so as to form the constellation, in the visual-field picture 101.

Furthermore, a light-and-shade image of the distribution of light incident on the virtual spherical surface (on the indicator 102) may be superimposed as the information onto the indicator 102.

Furthermore, the icon 151 that issues a notification of reception of, for example, a mail or a message, may be superimposed onto the indicator 102. In this case, when the icon 151 is operated, the contents of the mail or the message are displayed in the visual-field picture 101.

The user operates the information superimposed on the indicator 102 (icon 151) so that the user can browse the information or move to the location thereof.

The information superimposed on the indicator 102 (icon 151) can be displayed in superimposition on the visual-field picture 101. The visual-field picture 101 is part of the entire-celestial-sphere picture displayed on the indicator 102, and is the picture in the window 103 in the entire-celestial-sphere picture. Therefore, in a case where the icon 151 is present in the window 103, the icon 151 may be displayed at the corresponding position in the visual-field picture 101.

Furthermore, for example, the display of the icon 151 may change between a case where the visual field of the user comes close to the icon 151 and a case where the visual field of the user moves away from the icon 151. For example, the icon 151 may be displayed more deeply in the case where the visual field of the user comes close to the icon 151, and the icon 151 may be displayed more faintly in the case where the visual field of the user moves away from the icon 151.

Alternatively, for example, in the case where the visual field of the user moves away from the icon 151, the icon 151 may be displayed more deeply so as to cause the user to notice the display easily.

Furthermore, the icon 151 may be displayed only when the visual line of the user comes close to the icon 151. For example, the user can enjoy finding the icon 151 (information) with a sense of a treasure hunt.

Specific examples of use when the information is superimposed on the indicator 102, will be given. For example, the information superimposition can be used for disaster-relief remote operation. On the indicator 102, for example, the direction or the position of biological information is indicated with the icon 151, or the direction or the position of an exit in rubble or a collapsed building is indicated with the icon 151.

A device to which remote operation can be performed, captures a picture, and the picture transmitted from the device is displayed on the visual-field picture 101. The icon 151 is displayed at the position of the biological information on the indicator 102. Then, the user performing the remote operation moves the device toward the icon 151 with reference to the icon 151 displayed on the indicator 102. The information superimposition can be applied to the device.

Furthermore, for example, the information superimposition can be used for massively multiplayer online role-playing game (MMORPG). The MMORPG is a type of online game and has a computer-RPG motif. The MMORPG is a type of game to be held with the simultaneous participation of a large number of people on a large scale.

For a screen of the game, the screen of the game is displayed on the visual-field picture 101, and the indicator 102 is displayed on part of the screen. The direction or the position of occurrence of an event is indicated with the icon 151 on the indicator 102. Thus, the display of the occurrence spot of the event on the indicator 102 allows the user to recognize the occurrence spot of the event easily and to participate in the event easily.

Moreover, in order to cause the user to recognize the occurrence of the event, the indicator 102 may be displayed large when the event occurs. The large display of the indicator 102 enables the user to know the occurrence of the event, and the icon 151 enables the user to verify the occurrence spot of the event.

The enlarged display of the indicator 102 is not limited to the example, and thus can be performed when the indicator 102 attracts user's attention.

Furthermore, the information superimposition can be used for viewing, such as sports watching, concerts, theatergoing, or the like. The direction or the position of, for example, a player, a singer, an actor, or the like previously registered by the user is displayed with the icon 151 on the indicator 102.

The user can find the previously registered player, singer, or actor with reference to the icon 151 displayed on the indicator 102, so that the user can enjoy the sports watching, the concerts, the theatergoing, or the like.

Furthermore, the information superimposition can be used when the user enjoys, for example, birdwatching or the like. For example, the direction or the position of a flock of birds or a number of individuals, is indicated with the icon 151 on the indicator 102. The user can find and observe the birds with reference to the icon 151.

Thus, the display of the window 103 and the information (icon 151) on the indicator 102, enables the user to verify the part the user itself is viewing in the entire-celestial-sphere picture, with reference to the indicator 102. Furthermore, verification of the relative relationship from the position of the user itself to the position of the information enables movement to the desired information, or a direction operation of the information (icon 151) enables acquisition of the information.

Here, in a case where the icon 151 (information) is displayed on the indicator 102, as illustrated in FIG. 20, the icon 151 in proximity to the window 103 is provided to the user, but the icon 151 on the opposite face (hidden face) to the face on which the window 103 is present, has a display difficult to provide to the user.

Figure 21:
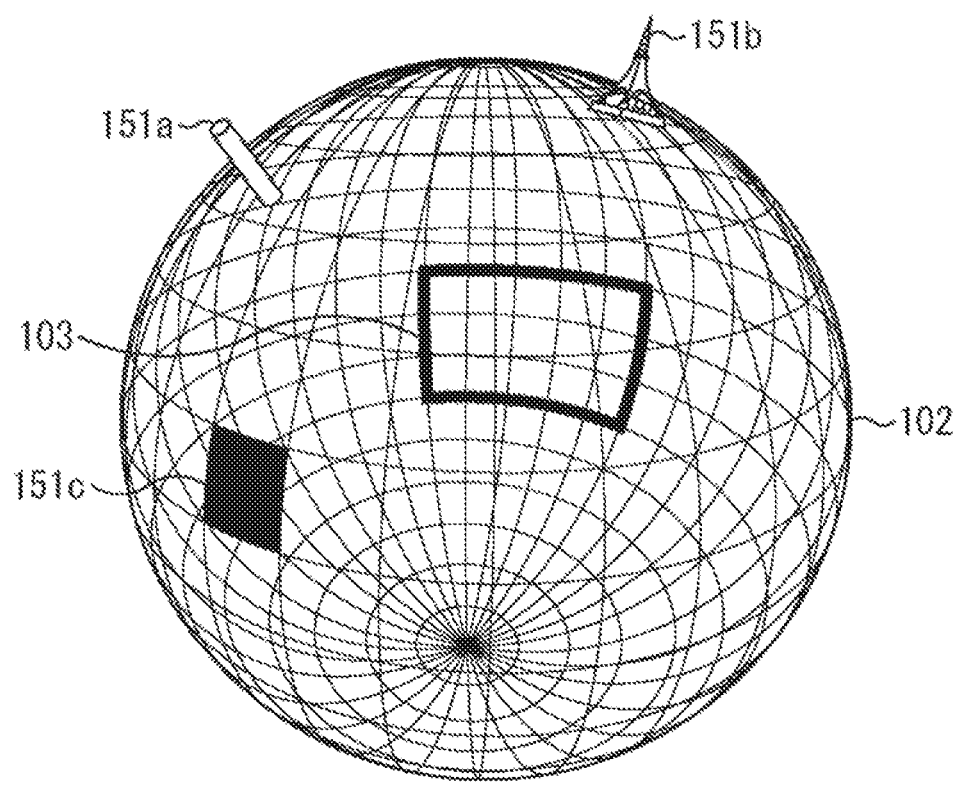
FIG. 21 is a view for describing display of a window.

Therefore, in order to notify the user of the information present in the part the user is not viewing, in other words, in order to notify the user of the information present outside the window 103, as illustrated in FIG. 21, the window 103 may be displayed on the hidden-face side such that the side the user is not viewing is displayed as the surface of the indicator 102.

In this case, the information (icon 151) present within the visible range to the user, is displayed on the picture the user is viewing, namely, on the visual-field picture 101, and the information (icon 151) present out of the visible range to the user is displayed on the indicator 102. The user views the visual-field picture 101 and the indicator 102 so that the user can acquire the information in the entire-celestial-sphere picture (the presence of the information).

Thus, in a case where the icon 151 (the information itself indicated by the icon 151) is displayed on the visual-field picture 101, there is a possibility that the number of icons 151 to be displayed in the visual-field picture 101 increases and the visual-field picture 101 is difficult to view. In this case, partial information from the information (icon 151) to be displayed in the visual-field picture 101, is displayed in the window 103 of the indicator 102.

The user views the display of the icon 151 in the window 103 of the indicator 102 so that the user can recognize and verify the presence of the information not displayed in the visual-field picture 101.

As described above, in a case where the window 103 is displayed on the hidden-face side of the indicator 102 and in a case where the user performs an operation, for example, a rotational operation to the indicator 102 and the window 103 moves along with the rotation of the indicator 102, when the window 103 is present on the hidden-face side of the indicator 102, the indicator 102 may be displayed translucently on the near side (surface side) and may be displayed opaquely on the far side (hidden-face side).

Furthermore, in a case where the window 103 remains steadily on the hidden-face side of the indicator 102, the hemisphere on the near side may be rendered in completely non-display after the elapse of a certain time.

In the display in this manner, even when the window 103 is present on the hidden-face side of the indicator 102, the translucent display on the near side enables display from which the position of the window 103 on the hidden-face side can be verified. Furthermore, because the icon 151 displayed on the near side is in display the user can verify, the user can verify the icon 151 and the window 103.

Furthermore, in a case where the window 103 is not present on the hidden-face side, in other words, in a case where the window 103 is present on the surface side, the indicator 102 is displayed opaquely. Thus, the display of the indicator 102 may change depending on whether or not the window 103 is present on the hidden-face side.

Note that, for example, because the indicator 102e illustrated in FIG. 9 is a two-dimensional indicator 102, the window 103e is not displayed on the hidden-face side. The plane indicator 102 may be displayed opaquely constantly.

Thus, according to the present technology, when part of the entire-celestial-sphere picture is viewed as the visual-field picture 101, the indicator 102 and the window 103 that indicate which part of the entire-celestial-sphere picture the picture being viewed is, can be displayed. The user views the indicator 102 and the window 103 so that the user can grasp easily which part in the entire-celestial-sphere picture the user itself is located in.

Furthermore, the user can determine how to go to a location the user itself desires to view (desires to go to), with the position and the range indicated by the indicator 102 (window 103) as a clue, so that the convenience in viewing can improve.

Furthermore, for example, in a case where the user views content having a featureless picture in terms of direction, such as the ground, the air, or the like, the user can intuitively grasp which direction or position in space the current visual-field range (visual-field picture 101) has, with reference to the direction indicated by the indicator 102 (the position of the window 103 in the indicator 102). Therefore, for example, psychological uneasiness in viewing can be relieved.

The case where the entire-celestial-sphere picture is handled has been exemplarily given in the embodiment described above. The entire-celestial-sphere picture is, for example, a picture (image) that is not browsable at a time even when reduced in size. For example, the back is not visible when the front is viewed, and the bottom is not visible when the top is viewed. In other words, the entire-celestial-sphere picture is a picture that is not visible omnidirectionally at a time.

Thus, while the user is browsing the picture (image) that is not browsable at a time, displaying information as to which part the user is viewing, namely, displaying the indicator 102 in the present embodiment, to the user enables acquisition of the effect described above.

The present technology is not limited to the entire-celestial-sphere picture, and thus can be applied to, for example, the content of a picture (image) or the like not visible omnidirectionally at a time, such as the content of a picture having an expanse three-dimensionally spatially.

Furthermore, superimposition of information onto the indicator 102 enables the user to grasp the position of the information in the entire-celestial-sphere picture when viewing only the indicator 102. Furthermore, display of the information with the icon 151 and display of the icon 151 with, for example, a shape or a color suitable to the information, facilitate transmission of the information to the user. Moreover, the user operates the icon 151 so that the user can acquire the information.

Because the user can operate the indicator 102, for example, the user can find a desired location or move to the desired location easily, so that the convenience in viewing can further improve.

Furthermore, embedment of the present technology in, for example, content authoring software for the entire-celestial-sphere picture, enables processing or editing intended for the direction of content, to be performed easily.

<Recording Medium>

The pieces of processing in series described above can be performed by hardware or can be performed by software. In a case where the pieces of processing in series are performed by software, a program included in the software is installed onto a computer. Here, examples of the computer include a computer built in dedicated hardware, a general-purpose personal computer capable of performing various functions due to installation of various programs, and the like.

For example, a program to be executed by the CPU 11 of the information processing device 10 illustrated in FIG. 1, that has been recorded in the removable medium 21 serving as a packaged medium or the like, for example, can be provided. Furthermore, the program can be provided through a wired transfer medium or a wireless transfer medium, such as a local area network, the Internet, or digital satellite broadcasting.

In the computer, putting the removable medium 21 into the drive 20 enables installation of the program onto the storage unit 18 through the input/output interface 15. Furthermore, receiving the program with the communication unit 19 through the wired transfer medium or the wireless transfer medium, enables installation of the program onto the storage unit 18. Alternatively, the program can be previously installed onto the ROM 12 or the storage unit 18.

Note that the program to be executed by the computer may be a program for performing processing on a time series basis in the order described in the present specification, or may be a program for performing processing in parallel or at the necessary timing at which a call is made, for example.

Furthermore, a system means the entire device including a plurality of devices in the present specification.

Note that the effects described in the present specification are, but are not limited to, just exemplifications, and thus other effects may be provided.

Note that an embodiment of the present technology is not limited to the embodiment described above, and thus various alterations may be made without departing from the scope of the spirit of the present technology.

Note that the present technology can also have the following configurations.

(1)

An information processing device including:

a control unit configured to control display of a screen, in which the screen includes:

a visual-field picture displaying a region of part of a three-dimensional picture;

an indicator having a shape expressing a three-dimensional direction of the three-dimensional picture; and a window expressing the region displayed as the visual-field picture in the indicator.

(2)

The information processing device described in (1) above, in which the three-dimensional picture is an entire-celestial-sphere picture.

(3)

The information processing device described in (1) or (2) above, in which the indicator is a three-dimensional sphere with wire frame.

(4)

The information processing device described in (3) above, in which the indicator has the three-dimensional sphere pasted with the three-dimensional picture as a texture.

(5)

The information processing device described in (1) or (2) above, in which the indicator is a three-dimensional sphere expressing a direction and an area of the window to the three-dimensional sphere, with three-dimensional polar coordinates or with quaternions and a pyramid.

(6)

The information processing device described in (1) or (2) above, in which the indicator is a figure including the three-dimensional picture projected in two dimensions.

(7)

The information processing device described in any of (1) to (6) above, in which the window is fixed, the indicator is movable, and in a case where the indicator moves and a picture in the window changes, the visual-field picture also changes in accordance with the change.

(8)

The information processing device described in any of (1) to (6) above, in which the window is movable, the indicator is fixed, and in a case where the window moves and a picture in the window changes, the visual-field picture also changes in accordance with the change.

(9)

The information processing device described in any of (1) to (6) above, in which the window is movable, the indicator is movable, and a position of the window to the indicator is fixed.

(10)

The information processing device described in (1) above, in which in a case where the indicator moves to a central portion of the visual-field picture, the indicator is rendered in enlarged display and is displayed on the visual-field picture.

(11)

The information processing device described in (1) above, in which the indicator is rendered in enlarged display, and the visual-field picture is switched to a picture visible in staying in the indicator.

(12)

The information processing device described in (1) above, in which in a case where the window is present on a hidden-face side of the indicator, the hidden-face side of the indicator is displayed opaquely and a near side of the indicator is displayed translucently.

(13)

The information processing device described in any of (1) to (12) above, in which an icon expressing presence of predetermined information, is displayed on the indicator.

(14)

The information processing device described in (13) above, in which in a case where the icon is operated, the information associated with the icon is displayed in the visual-field picture.

(15)

The information processing device described in (13) or (14) above, in which the icon is a figure expressing an orientation, a map symbol, or a landmark on a map.

(16)

The information processing device described in (13) or (14) above, in which the icon expresses an already viewed region in the three-dimensional picture.

(17)

The information processing device described in (13) above, in which the icon expresses a region a different user is viewing in the three-dimensional picture.

(18)

The information processing device described in any of (13) to (17) above, in which the window is displayed on a hidden-face side of the indicator, and the icon is displayed on a near side of the indicator.

(19)

An information processing method including:

a step of controlling display of a screen, in which the screen includes:

a visual-field picture displaying a region of part of a three-dimensional picture;

an indicator having a shape expressing a three-dimensional direction of the three-dimensional picture; and a window expressing the region displayed as the visual-field picture in the indicator.

(20)

A program for causing a computer to perform processing including:

a step of controlling display of a screen, in which the screen includes:

a visual-field picture displaying a region of part of a three-dimensional picture;

an indicator having a shape expressing a three-dimensional direction of the three-dimensional picture; and a window expressing the region displayed as the visual-field picture in the indicator.

REFERENCE SIGNS LIST

10 Information processing device
11 CPU
51 Display unit
52 Indicator setting unit
53 Sensor
54 Picture-data input unit
55 Indicator generation unit
56 Perspective conversion unit
57 Decoding unit
58 Picture combination unit
101 Visual-field picture
102 Indicator
103 Window
151 Icon

The invention claimed is:

1. An information processing device comprising:
display screen; and
a central processing unit (CPU) configured to:
control the display screen to display a visual-field picture and an indicator,
wherein
the visual-field picture displays a first region of a three-dimensional picture,
the indicator includes a window,
the indicator is movable,
a shape of the indicator indicates a three-dimensional direction of the three-dimensional picture,
the window is fixed relative to the display screen, and
the window displays a specific picture corresponding to the first region displayed as the visual-field picture; and
controls the display screen to:
change the specific picture in the window based on a movement of the indicator; and
change the visual-field picture, that displays the first region of the three-dimensional picture, based on the change of the specific picture in the window.

2. The information processing device according to claim 1, wherein the three-dimensional picture is an entire-celestial-sphere picture.

3. The information processing device according to claim 1, wherein the indicator is a three-dimensional sphere of a wire frame.

4. The information processing device according to claim 3, wherein the three-dimensional sphere includes the three-dimensional picture as a texture.

5. The information processing device according to claim 1, wherein the indicator is a three-dimensional sphere that indicates at least one of a specific direction or an area of the window based on at least one of three-dimensional polar coordinates, quaternions, or a pyramid.

6. The information processing device according to claim 1, wherein the indicator further includes the three-dimensional picture projected in two dimensions.

7. The information processing device according to claim 1, wherein the CPU is further configured to enlarge the display of the indicator, based on the movement of the indicator to a central portion of the visual-field picture.

8. The information processing device according to claim 1, wherein the CPU is further configured to:
enlarge the display of the indicator; and
display the visual-field picture inside the indicator based on the enlargement of the display of the indicator.

9. The information processing device according to claim 1, wherein the CPU is further configured to:
display a hidden-face side of the indicator in an opaque state based on presence of the window on the hidden-face side of the indicator; and
display a surface side of the indicator in a translucent state based on the presence of the window on the hidden-face side of the indicator.

10. The information processing device according to claim 1, wherein
the CPU is further configured to display an icon on the indicator, and
the icon indicates presence of specific information on the indicator.

11. The information processing device according to claim 10, wherein
the CPU is further configured to display the specific information, associated with the icon, in the visual-field picture, and
the specific information is displayed based on an operation on the icon.

12. The information processing device according to claim 10, wherein the icon corresponds to at least one of a map symbol or a landmark on a map.

13. The information processing device according to claim 10, wherein the icon indicates a viewed region in the three-dimensional picture.

14. The information processing device according to claim 10, wherein the first region of the visual-field picture is viewed by a first user, and the icon indicates a second region, in the three-dimensional picture, viewed by a second user.

15. The information processing device according to claim 10, wherein the CPU is further configured to control the display screen to:

display the window on a hidden-face side of the indicator, and display the icon on a surface side of the indicator.

16. An information processing method comprising:

controlling a display screen to display a visual-field picture and an indicator, wherein the visual-field picture displays a region of a three-dimensional picture, the indicator includes a window, the indicator is movable, a shape of the indicator indicates a three-dimensional direction of the three-dimensional picture, the window is fixed relative to the display screen, and the window displays a specific picture corresponding to the region displayed as the visual-field picture; and controlling the display screen to:

change the specific picture in the window based on a movement of the indicator; and change the visual-field picture, that displays the region of the three-dimensional picture, based on the change of the specific picture in the window.

17. A non-transitory computer-readable medium having stored thereon, computer-executable instructions which when executed by a computer, cause the computer to execute operations, the operations controlling a display screen to display a visual-field picture and an indicator, wherein the visual-field picture displays a region of a three-dimensional picture, the indicator includes a window, the indicator is movable, a shape of the indicator indicates a three-dimensional direction of the three-dimensional picture, the window is fixed relative to the display screen, and the window displays a specific picture corresponding to the region displayed as the visual-field picture; and controlling the display screen to:

change the specific picture in the window based on a movement of the indicator; and change the visual-field picture, that displays the region of the three-dimensional picture, based on the change of the specific picture in the window.

18. An information processing device, comprising:

a display screen; and a central processing unit (CPU) configured to:

control the display screen to display a visual-field picture and an indicator, wherein the visual-field picture displays a region of a three-dimensional picture, the indicator includes a window, a shape of the indicator indicates a three-dimensional direction of the three-dimensional picture, and the window displays a specific picture corresponding to the region displayed as the visual-field picture; and control the display screen to:

display a hidden-face side of the indicator in an opaque state based on presence of the window on the hidden-face side of the indicator; and display a surface side of the indicator in a translucent state based on the presence of the window on the hidden-face side of the indicator.

* * * * *